United States Patent
Sekiya et al.

(10) Patent No.: US 9,010,881 B2
(45) Date of Patent: Apr. 21, 2015

(54) BRAKING APPARATUS FOR VEHICLE

(75) Inventors: Yoshihide Sekiya, Chiryu (JP); Shiro Monzaki, Mishima (JP); Yasuaki Tsurumi, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 473 days.

(21) Appl. No.: 13/145,812

(22) PCT Filed: Nov. 9, 2009

(86) PCT No.: PCT/JP2009/069411
§ 371 (c)(1),
(2), (4) Date: Jul. 22, 2011

(87) PCT Pub. No.: WO2011/055464
PCT Pub. Date: May 12, 2011

(65) Prior Publication Data
US 2011/0272230 A1  Nov. 10, 2011

(51) Int. Cl.
*B60T 8/32* (2006.01)
*B60T 7/04* (2006.01)
(Continued)

(52) U.S. Cl.
CPC ............. *B60T 7/042* (2013.01); *B60T 2250/00* (2013.01); *B60T 1/10* (2013.01); *B60T 8/1766* (2013.01);
(Continued)

(58) Field of Classification Search
CPC ......... B60T 2250/00; B60T 8/00; B60T 8/17; B60T 8/171; B60T 8/26; B60T 2210/00; B60T 17/22; B60L 2240/36
USPC ............. 303/3, 9.61, 9.62, 20, 155, 186, 191; 188/1.11 R, 1.11 E See application file for complete search history.

(56) References Cited

U.S. PATENT DOCUMENTS 6,959,794 B2 * 11/2005 Ralea et al. .................... 188/156
2006/0157102 A1    7/2006 Nakajima et al.
(Continued)

FOREIGN PATENT DOCUMENTS

DE  10 2005 052 629 A1   5/2007
JP  62299460 A  * 12/1987
(Continued)

OTHER PUBLICATIONS

International Search Report issued Jan. 12, 2010 in PCT/JP09/069411 filed Nov. 9, 2009.

*Primary Examiner* — Melody Burch
(74) *Attorney, Agent, or Firm* — Oblon, McClelland, Maier & Neustadt, L.L.P.

(57) ABSTRACT

An electronic control unit inputs from temperature sensors a temperature of the heating side of a thermoelectric conversion section assembled to each of brake units provided for left and right rear wheels. When the temperature of the heating side is equal to or lower than a predetermined temperature, the electronic control unit drives and controls a brake hydraulic pressure control section so as to operate the brake units preferentially over brake units provided for left and right front wheels. With this operation, each of the brake units generates friction heat, and heats the heating side of the corresponding thermoelectric conversion section, whereby the thermoelectric conversion section efficiently collects thermal energy and generates electrical power. Meanwhile, when the heating side temperature is higher than the predetermined temperature, the electronic control unit drives and controls the brake hydraulic pressure control section so as to decrease the proportion of the braking forces applied by the brake units and increase the proportion of the braking forces applied by the brake units.

14 Claims, 17 Drawing Sheets

(51) Int. Cl.
  *B60T 1/10* (2006.01)
  *B60T 8/1766* (2006.01)
  *B60T 8/26* (2006.01)
  *B60T 13/58* (2006.01)
  *B60T 17/22* (2006.01)
  *B60L 3/00* (2006.01)
  *B60L 7/26* (2006.01)
  *B60L 11/14* (2006.01)
  *B60T 13/74* (2006.01)

(52) U.S. Cl.
  CPC ............... *B60T 8/267* (2013.01); *B60T 13/586* (2013.01); *B60T 17/22* (2013.01); *B60L 3/0061* (2013.01); *B60L 7/26* (2013.01); *B60L 11/14* (2013.01); *B60L 2210/10* (2013.01); *B60L 2220/44* (2013.01); *B60L 2240/12* (2013.01); *B60L 2240/36* (2013.01); *B60L 2240/445* (2013.01); *B60L 2250/26* (2013.01); *B60L 2200/26* (2013.01); *Y02T 10/7077* (2013.01); *Y02T 10/7216* (2013.01); *Y02T 10/70* (2013.01)

(56) References Cited

U.S. PATENT DOCUMENTS

| | | | |
|---|---|---|---|
| 2007/0194623 A1* | 8/2007 | Miyazaki | 303/191 |
| 2008/0217116 A1* | 9/2008 | Bonfanti et al. | 188/71.6 |
| 2008/0223427 A1 | 9/2008 | Ohno | |
| 2010/0187899 A1* | 7/2010 | Suzuki | 303/3 |
| 2010/0235065 A1* | 9/2010 | Logan et al. | 701/80 |

FOREIGN PATENT DOCUMENTS

| | | |
|---|---|---|
| JP | 4 17527 | 2/1992 |
| JP | 7 228225 | 8/1995 |
| JP | 11 220804 | 8/1999 |
| JP | 2004 282851 | 10/2004 |
| JP | 2005 341700 | 12/2005 |
| JP | 2006 347506 | 12/2006 |
| JP | 2008 547370 | 12/2008 |
| JP | 2009 87955 | 4/2009 |
| WO | 2008 111218 | 9/2008 |

* cited by examiner

BRAKING APPARATUS FOR VEHICLE

TECHNICAL FIELD

The present invention relates to a braking apparatus for a vehicle such as an automobile, and more particularly to a braking apparatus for a vehicle which brakes wheels of the vehicle and which also collects thermal energy generated as a result of braking.

BACKGROUND ART

In recent years, active studies have been carried out on a technique of collecting thermal energy generated as a result of traveling of a vehicle, and converting the collected thermal energy to, for example, electric energy for effective use.

For example, Japanese Patent Application Laid-Open (kokai) No. H11-220804 shows a regeneration brake apparatus comprising a brake caliper which presses a brake pad against a rotation portion to thereby effect braking, a heat pipe connected to the brake caliper, a thermoelectric conversion element connected to a heart radiation end of the heat pipe, a radiator connected to a cooling side surface of the thermoelectric conversion element, and a battery connected to the thermoelectric conversion element. In this regeneration brake apparatus, friction heat generated as a result of braking is transmitted to a heating surface of the thermoelectric conversion element via the heat pipe, and a cooling surface of the thermoelectric conversion element is cooled by the radiator. By virtue of this configuration, the thermoelectric conversion element generates electric power in accordance with a temperature difference between the heating side and the cooling side, and the generated electric power is stored in the battery.

Also, for example, Japanese Patent Application Laid-Open (kokai) No. 2004-282851 discloses an in-wheel generator mechanism in which a Peltier element generates electric energy (electric power) by making use of a temperature gradient produced by heat generation at a bearing assembled into a wheel hub of a car and heat radiation at a wheel of the car. In this in-wheel generator mechanism, electric power generated by the Peltier element is used to drive a sensor system.

Furthermore, for example, Japanese Utility-Model Application Laid-Open (kokai) No. H4-17527 shows a brake oil cooling apparatus in which a thermoelectric element for cooling which exhibits a cooling action upon supply of electric power thereto is disposed near a flow path of brake oil; a thermoelectric element for electricity generation which converts heat to electric power is provided at a heat generation portion of an automobile; and electric power is fed from the thermoelectric element for electricity generation to the thermoelectric element for cooling. In this brake oil cooling apparatus, since electric power converted from heat by the thermoelectric element for electricity generation is supplied to the thermoelectric element for cooling, the thermoelectric element for cooling cools brake oil.

Moreover, for example, Japanese Patent Application Laid-Open (kokai) No. 2005-341700 discloses a thermoelectric generation apparatus which uses hot cooling water flowing out of an engine as a high-temperature-side heat source, and uses cooling water having passed through a radiator as a low-temperature-side heat source, and in which a thermoelectric element generates electricity by making use of a temperature difference between the high-temperature-side heat source and the low-temperature-side heat source. In this thermoelectric generation apparatus, since the high-temperature-side heat source and the low-temperature-side heat source can be secured stably, the thermoelectric element can generate electric power efficiently. The generated electric power is charged into a battery or used for operating various auxiliary devices around the engine.

DISCLOSURE OF THE INVENTION

Incidentally, in the case where a thermoelectric conversion element (heat collection means) is used to collect thermal energy and convert it to, for example, electric energy, in general, it is said that the greater the temperature difference between the heating and cooling sides of the thermoelectric conversion element, the higher the conversion efficiency. Therefore, in the case where a thermoelectric conversion element is mounted on a vehicle so as to collect thermal energy and convert it to electric energy, preferably, an apparatus which generates heat and increases in temperature when the vehicle travels is used as a heat source in order to heat the heating side of the thermoelectric conversion element.

A braking apparatus of a vehicle which generates braking force by means of friction can be used as such a heat source, and use of the braking apparatus is considerably effective, because the braking apparatus produces high temperature as a result of generation of friction heat. However, a braking apparatus of a vehicle (hereinafter may be referred to as a "vehicular braking apparatus") has a limit operation temperature under which the braking apparatus can generate proper braking force at all times. That is, the vehicular braking apparatus has a characteristic such that, when the temperature of a friction portion increases, its friction coefficient decreases. Therefore, when the vehicular braking apparatus is operated at high temperature, there arises a so-called fading phenomenon in which braking force decreases.

In the case where thermal energy is collected and is converted to electric energy through use of a thermoelectric conversion element as described above, from the viewpoint of the conversion efficiency of the thermoelectric conversion element, it is desired to maintain the vehicular braking apparatus itself at high temperature without releasing friction heat generated when the vehicular braking apparatus operates. Meanwhile, from the viewpoint of properly operating the vehicular braking apparatus, it is desired to maintain the vehicular braking apparatus itself at low temperature by means of releasing the generated friction heat; i.e., by means of properly cooling the braking apparatus.

Accordingly, in the case where friction heat; i.e., thermal energy, which is generated as a result of operation of the vehicular braking apparatus is collected and converted to, for example, electric energy by use of a thermoelectric conversion element (heat collection means), it is very important to satisfy a conflicting requirement of improving the thermal energy collection efficiency of the heat collection means without decreasing the braking force of the vehicular braking apparatus.

The present invention has been accomplished so as to solve the above-described problems, and its object is to provide a braking apparatus for a vehicle which properly brakes the vehicle and which efficiently collect thermal energy of the vehicle.

In order to achieve the above-described object, the present invention provides a vehicular braking apparatus which applies braking forces against rotations of wheels and which collects thermal energy generated as a result of application of the braking forces, characterized by comprising first braking force application means for applying braking force against rotation of a wheel by means of friction, the first braking force application means including heat collection means for collecting thermal energy generated by the friction; second braking force application means for applying braking force against rotation of a wheel by means of friction; temperature detection means for detecting a temperature which changes as a result of application of frictional braking force by the first braking force application means; braking request detection means for detecting a driver's request for braking the vehicle; and braking-force-distribution changing means for changing and setting a proportion of the braking force applied by the first braking force application means and a proportion of the braking force applied by the second braking force application means in accordance with the driver's request for braking the vehicle detected by the braking request detection means, wherein, when the temperature detected by the temperature detection means satisfies a predetermined condition, the braking-force-distribution changing means sets the proportion of the braking force applied by the first braking force application means to become lager than the proportion of the braking force applied by the second braking force application means; and, when the temperature detected by the temperature detection means does not satisfy the predetermined condition, the braking-force-distribution changing means sets the proportion of the braking force applied by the second braking force application means to become lager than the proportion of the braking force applied by the first braking force application means.

In this case, preferably, the first braking force application means applies braking forces to left and right rear wheels of the vehicle, and the second braking force application means applies braking forces to left and right front wheels of the vehicle.

In these cases, the first braking force application means may be a drum brake, and the second braking force application means may be a disc brake. Alternatively, the first braking force application means may be a drum-in disc brake in which a drum bake is incorporated into a disk brake. Alternatively, the first braking force application means may be composed of a single brake disc and one of two calipers provided for the brake disc, the heat collection means being brought into contact with and separated from the brake disc by the one caliper so as to apply braking force against rotation of the wheel by means of friction; and the second braking force application means may be composed of the single brake disc and the other of the two calipers provided for the brake disc, wherein a brake pad is brought into contact with and separated from the brake disc by the other caliper so as to apply braking force against rotation of the wheel by means of friction.

By virtue of these configurations, when the temperature which changes as a result of application of frictional braking force by the first braking force application means satisfies the predetermined condition, the braking-force-distribution changing means can set the braking force distribution such that the proportion of the braking force applied by the first braking force application means becomes lager than the proportion of the braking force applied by the second braking force application means. That is, the predetermined condition is satisfied, the braking-force-distribution changing means can operate the first braking force application means preferentially. By virtue of this operation, the first braking force application means including the heat collection means can be operated preferentially so as to actively generate thermal energy, and the heat collection means can collect the generated thermal energy.

Meanwhile, when the temperature which changes as a result of application of frictional braking force by the first braking force application means does not satisfy the predetermined condition, the braking-force-distribution changing means can set the braking force distribution such that the proportion of the braking force applied by the second braking force application means becomes lager than the proportion of the braking force applied by the first braking force application means. That is, the predetermined condition is not satisfied, the braking-force-distribution changing means can operate the second braking force application means preferentially. By virtue of this operation, generation of thermal energy can be restrained by reducing the braking force applied by the first braking force application means; in other words, by decreasing the frequency of operation of the first braking force application means. Accordingly, even in the case where a braking apparatus having an excellent heat retaining performance, such as a drum brake, is employed for the first braking force application means, occurrence of a fading phenomenon can be prevented effectively. Furthermore, whereas the braking force applied by the first braking force application means can be decreased, the braking force applied by the second braking force application means can be increased; in other words, the frequency of operation of the second braking force application means can be increased. Therefore, the braking force necessary for braking the vehicle is not impaired, and it is possible to properly decelerate the vehicle, while securing stable vehicle behavior, in particular in the case where the second braking force application means is provided for the left and right front wheels.

Therefore, it is possible to satisfy a conflicting requirement of improving the thermal energy collection efficiency of the heat collection means without decreasing the braking force of the vehicular braking apparatus.

In this case, preferably, when the temperature detected by the temperature detection means satisfies the predetermined condition, the braking-force-distribution changing means sets the proportion of the braking force applied by the second braking force application means to zero.

By virtue of this configuration, when the temperature which changes as a result of application of frictional braking force by the first braking force application means satisfies the predetermined condition, the braking-force-distribution changing means can decrease the proportion of the braking force applied by the second braking force application means to zero; in other words, can operate only the first braking force application means. With this operation, the first braking force application means can generate thermal energy more actively and quickly, and the heat collection means can collect the generated thermal energy more efficiently.

In these cases, preferably, the predetermined condition is such that the temperature detected by the temperature detection means is equal to or lower than a predetermined temperature. In this case, preferably, the predetermined temperature is determined on the basis of a temperature characteristic of the heat collection means, and is equal to a lower limit temperature of a temperature region for collection of the thermal energy, or a temperature at which the frictional braking force of the first braking force application means starts to decrease.

By virtue of these configurations, when the temperature which changes as a result of application of frictional braking force by the first braking force application means is equal to or lower than the lower limit temperature of the temperature region in which the heat collection means collets thermal energy, the predetermined condition is satisfied. Therefore, the braking-force-distribution changing means can set the proportion of the braking force applied by the first braking force application means to be grater than the proportion of the braking force applied by the second braking force application means, or set the proportion of the braking force applied by the second braking force application means to zero. With this operation, the first braking force application means including the heat collection means can be operated preferentially so as to actively generate thermal energy, to thereby increase the temperature to the temperature region in which the heat collection means collects thermal energy. Accordingly, the heat collection means can collect the generated thermal energy quite efficiently.

Furthermore, when the temperature which changes as a result of application of frictional braking force by the first braking force application means is equal to or lower than the temperature at which the frictional braking force of the first braking force application means starts to decrease, the predetermined condition is satisfied. Therefore, even when the braking-force-distribution changing means operates the first braking force application means preferentially, the first braking force application means can be prevented from suffering a fading phenomenon.

In the case where the proportion of the braking force applied by the second braking force application means is set to zero, preferably, the braking-force-distribution changing means increases the proportion of the braking force applied by the second braking force application means when a demanded braking force corresponding to the braking request detected by the braking request detection means is greater than the braking force applied by the first braking force application means. In this case, preferably, the demanded braking force corresponding to the braking request detected by the braking request detection means represents a deceleration of the vehicle requested by the driver; and the braking-force-distribution changing means increases the proportion of the braking force applied by the second braking force application means when the deceleration of the vehicle requested by the driver is greater than a deceleration which is generated in the vehicle upon application of braking force by the first braking force application means.

By virtue of these configurations, even in a situation where only the braking force of the first braking force application means is applied, if the braking force is insufficient as compared with the demanded braking force (deceleration), the braking force of the second braking force application means can be added. Thus, the braking force necessary for braking the vehicle properly can be secured.

Another feature of the present invention resides in that the braking-force-distribution changing means sets the proportion of the braking force applied by the first braking force application means to zero, when the temperature detected by the temperature detection means does not satisfy the predetermined condition and the temperature detected by the temperature detection means is equal to or higher than an upper limit temperature of a temperature region which is determined on the basis of the temperature characteristic of the heat collection means and in which the thermal energy is collected.

By virtue of this configuration, when the temperature which changes as a result of application of frictional braking force by the first braking force application means reaches a temperature at which the efficiency of collection of thermal energy by the heat collection means starts to decrease, the braking-force-distribution changing means can set the proportion of the braking force applied by the first braking force application means to zero; in other words, can operate the second braking force application means only. With this operation, an increase in the temperature which changes as a result of application of frictional braking force by the first braking force application means can be restrained, and the efficiency of collection of thermal energy by the heat collection means can be maintained satisfactorily. Meanwhile, by means of setting the breaking force applied by the first braking force application means to zero, occurrence of a fading phenomenon can be prevented effectively.

In this case, preferably, when the demanded braking force corresponding to the braking request detected by the braking request detection means is greater than the braking force applied by the second braking force application means, the braking-force-distribution changing means increases the proportion of the braking force applied by the first braking force application means. In this case, preferably, the demanded braking force corresponding to the braking request detected by the braking request detection means represents a deceleration of the vehicle requested by the driver; and the braking-force-distribution changing means increases the proportion of the braking force applied by the first braking force application means when the deceleration of the vehicle requested by the driver is greater than a deceleration which is generated in the vehicle upon application of braking force by the second braking force application means.

By virtue of these configurations, even in a situation where only the braking force of the second braking force application means is applied, if the braking force is insufficient as compared with the demanded braking force (deceleration), the braking force of the first braking force application means can be added. Thus, the braking force necessary for braking the vehicle properly can be secured, although the efficiency of collection of thermal energy by the heat collection means decreases slightly.

Still another feature of the present invention resides in that the vehicular braking apparatus further comprises physical quantity detection means for detecting a physical quantity associated with a change in behavior of the vehicle; and the braking-force-distribution changing means increases the proportion of the braking force applied by the second braking force application means or the proportion of the braking force applied by the first braking force application means by making use of the physical quantity detected by the physical quantity detection means, when a change in behavior of the vehicle arises.

By virtue of this configuration, in the above-described situation where the proportion of the braking force applied by the second braking force application means is set to zero or the proportion of the braking force applied by the first braking force application means is set to zero, if a change in behavior of the vehicle has occurred or is likely to occur, the braking-force-distribution changing means can increase the proportion of the braking force applied by the second braking force application means or the proportion of the braking force applied by the first braking force application means, which has been set to zero. In this case, since braking forces can be applied to the left and right front wheels and the left and right rear wheels of the vehicle; that is, all the wheels of the vehicle, the vehicle can be decelerated properly, while such a change in behavior of the vehicle can be restrained effectively.

Still another feature of the present invention resides in that the first braking force application means is provided within a transmission which is connected to an engine of the vehicle and to drive wheels of the vehicle, applies braking force to an output shaft of the transmission by means of friction to thereby apply braking force against rotations of the drive wheels, and includes heat collection means for collecting thermal energy generated by the friction.

By virtue of this configuration, the first braking force application means can be provided within the transmission of the vehicle so as to apply braking force to the drive wheels of the vehicle. Thus, it becomes possible to omit braking apparatuses conventionally provided on an unsprung portion of the vehicle including wheels, whereby a so-called unsprung load can be reduced.

In this case, preferably, the heat collection means includes heat exchange means for performing heat exchange between cooling water supplied to the engine and lubrication oil which flows through the transmission and whose temperature increases upon application of frictional braking force to the output shaft of the transmission; and thermal energy carried by the cooling water having undergone heat exchange performed by the heat exchange means and having flowed through the engine is collected.

In this case, preferably, the temperature detection means detects the temperature of the cooling water having flowed through the engine and the temperature of the lubrication oil having flowed through the transmission; the predetermined condition is such that the water temperature and the oil temperature detected by the temperature detection means are equal to or lower than respective predetermined temperatures set for the water temperature and the oil temperature. In this case, preferably, the predetermined temperatures are determined on the basis of temperatures at which the engine of the vehicle and the transmission operate properly.

By virtue of these configuration, heat (thermal energy) generated as a result of application of braking fore by the first braking force application means is transmitted via the lubrication oil, and the heat exchange means can collect thermal energy through heat exchange between the lubrication oil and the cooling water. Thus, the collected thermal energy can be used to heat the cooling water. Accordingly, even in a situation where the engine of the vehicle is overcooled (for example, in a cold period or when the vehicle travels on a downhill), since the heated cooling water can be supplied to the engine, the engine can be operated properly.

Furthermore, the heated cooling water; in other words, the cooling water to which a thermal energy generated as a result of application of braking force by the first braking force application means has been imparted through heat exchange can receive a thermal energy generated as a result of operation of the engine while flowing through the engine. The heat collection means can collect the thermal energies carried by the cooling water. Thus, the heat collection means can collect thermal energies generated as a result of traveling of the vehicle.

In this case, when both the cooling water temperature and the lubrication oil temperature are equal to or lower than the corresponding predetermined temperatures, the first braking force application means can be operated preferentially. With this operation, the lubrication oil temperature and the cooling water temperature can be maintained properly, and the engine and the transmission can be operated properly. In addition, the efficiency of collection of thermal energy by the heat collection means can be secured satisfactorily.

Preferably, the heat collection means is configured to covert to electric energy the thermal energy generated as a result of application of frictional braking force by the first braking force application means. In this case, more preferably, the heat collection means is a thermoelectric conversion element whose one side is heated by friction heat generated by the friction in the first braking force application means, whose other side is cooled, and which converts the thermal energy to the electric energy in accordance with a temperature difference between the one side and the other side.

By virtue of this configuration, the thermal energy (friction heat) generated as a result of application of frictional braking force by the first braking force application means can be collected and converted to electric energy. By means of storing the collected electric energy in the form of, for example, electric power, the collected electric energy can be supplied to equipment mounted on the vehicle so as to operate the equipment. Accordingly, the thermal energy generated as a result of braking can be used effectively without wasting it.

BEST MODE FOR CARRYING OUT THE INVENTION a. First Embodiment

Figure 1:
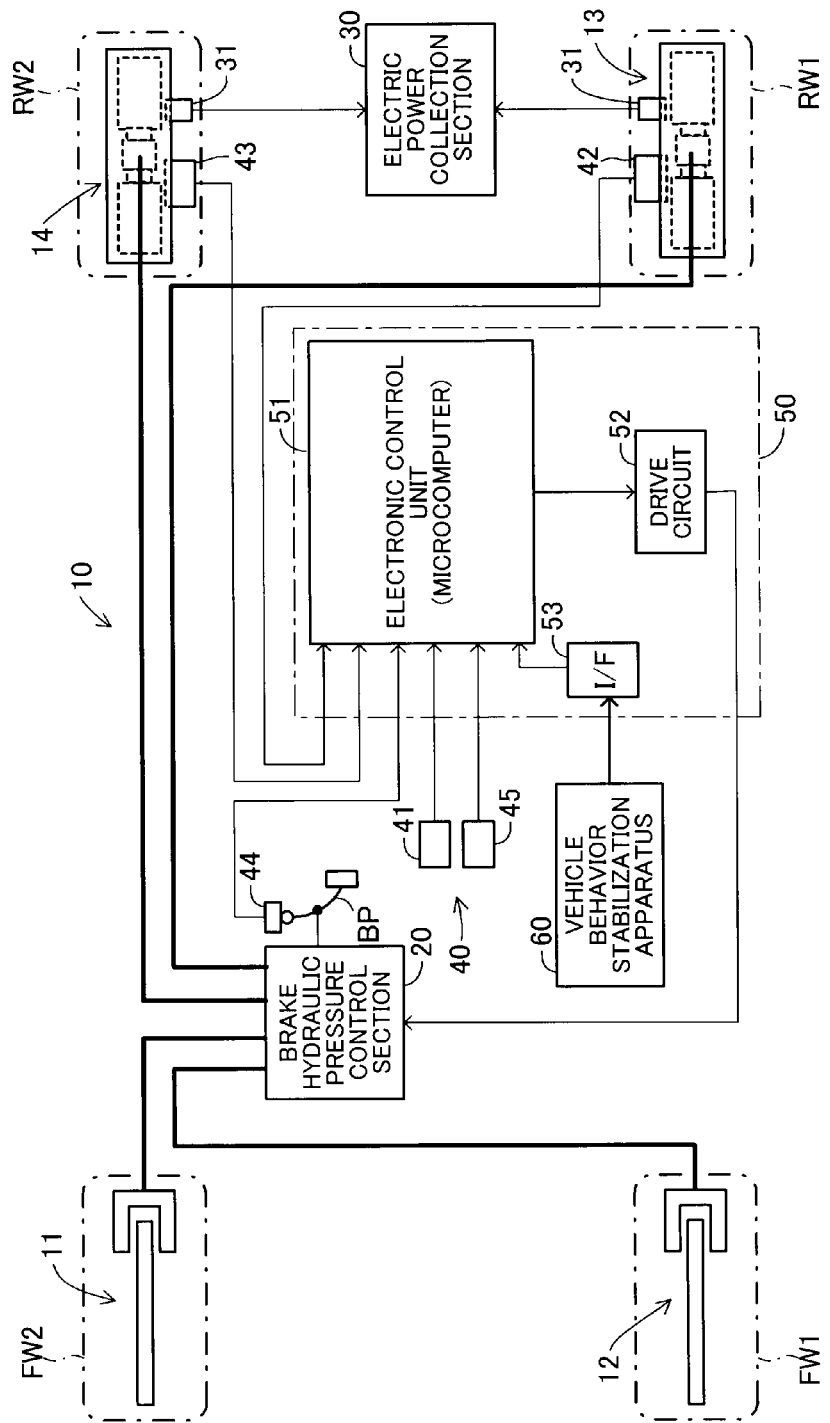
FIG. 1 is a schematic diagram showing the configuration of a vehicular braking apparatus which is common between first and second embodiments of the present invention.

Vehicular braking apparatuses according to various embodiments of the present invention will now be described in detail with reference to the drawings. FIG. 1 schematically shows the configuration of a vehicle on which a vehicular braking apparatus 10 which is common between first and second embodiments of the present invention is mounted.

The braking apparatus 10 includes brake units 11, 12 which apply braking forces against rotations of left and right front wheels FW1, FW2 and which are excellent in cooling, and brake units 13, 14 which apply braking forces to rotations of left and right rear wheels RW1, RW2 and which are excellent in heat retention. Although not illustrated in detail in FIG. 2, the brake units 11, 12 are disc brake units. The disc brake units include brake discs which rotate together with the left and right front wheels FW1, FW2, and calipers which are fixed to, for example, front axles and have wheel cylinders Wfr, Wfl. Brake pads fixed to the calipers are pressed against the corresponding brake discs so as to generate braking forces by means of friction. Since the brake units 11, 12 are disc brake units, the brake discs are always exposed to the outside air. Therefore, even when the temperature of each brake disc increases due to friction heat generated as a result of friction engagement between the brake disc and the corresponding brake pads, the brake disc is quickly cooled, for example, by a flow of air (traveling wind) which passes through the vicinity of the brake disc as a result of traveling of the vehicle. Therefore, the brake units 11, 12 are brake units from which generated friction heat can be released easily; in other words, brake units which are excellent in cooling.

Figure 2:
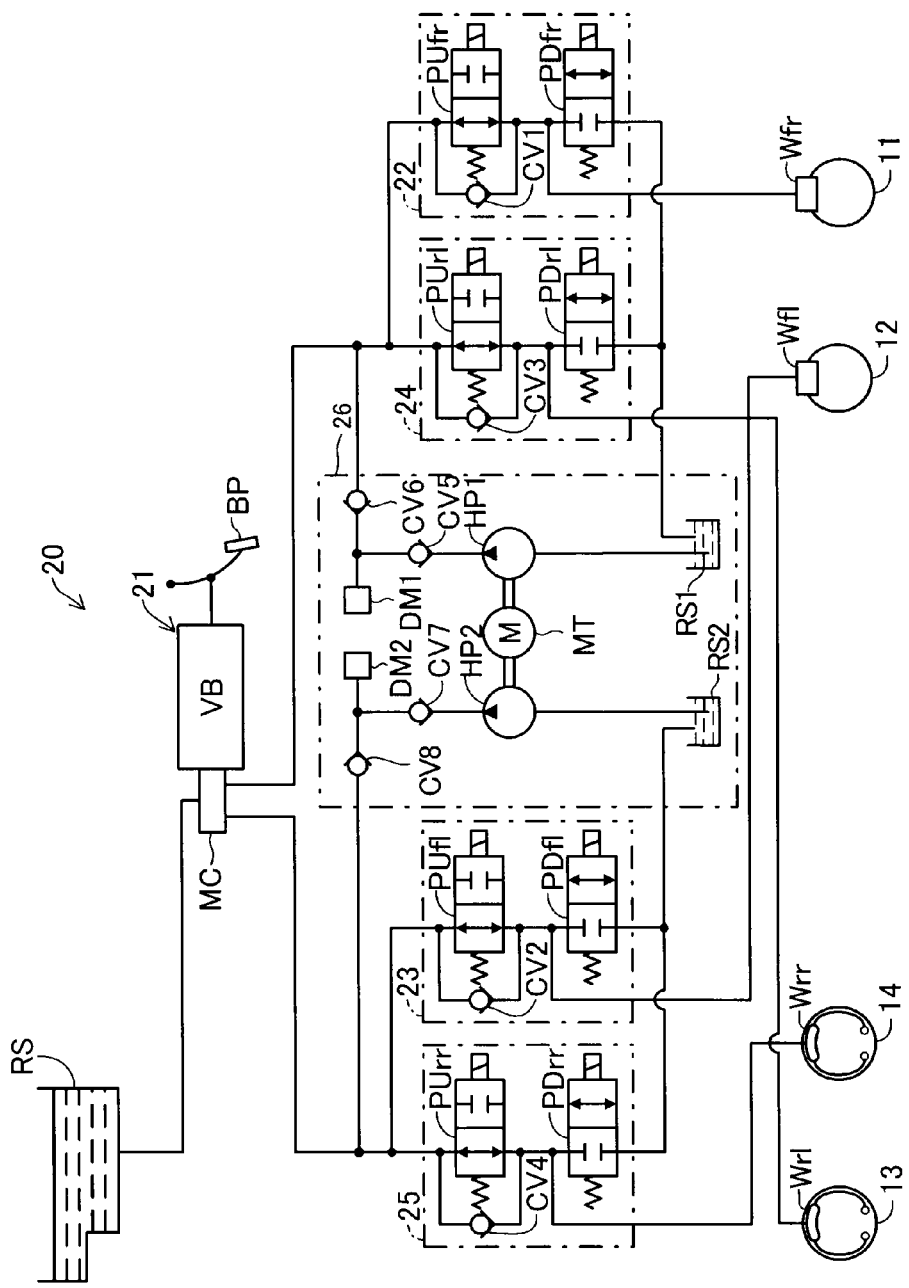
FIG. 2 is a schematic diagram showing the configuration of a brake hydraulic pressure control section of FIG. 1.

Although not illustrated in detail in FIG. 2, the brake units 13, 14 are drum brake units. The drum brake units include brake drums which rotate together with the left and right rear wheels RW1, RW2, and brake shoes which are operated by wheel cylinders Wrl, Wrr assembled to back plates which are non-rotatably fixed to, for example, rear axles. Brake shoes are pressed against the brake drums so as to generate braking forces by means of friction. Since the brake units 13, 14 are drum brake units, the open side of each brake drum is closed by the back plate, whereby a space is formed by the brake drum and the back plate. Notably, in the following description, this formed space is referred to as an internal space.

Since the internal space of each brake unit is not exposed directly to the outside air, the friction heat generated as a result of friction engagement between the inner circumferential surface of the brake drum and the brake shoes tends to be retained within the internal space. Accordingly, the brake units 13, 14 (drum brake units) are brake units from which friction heat is difficult to release as compared with the brake units 11, 12 (disc brake units); in other words, brake units which are excellent in heat retention.

Notably, the structures and operations of the disc brake units and the drum brake units are the same as those of widely known conventional brake units. Therefore, detailed descriptions regarding the structures and operations of the disc brake units and the drum brake units are omitted.

The vehicular braking apparatus 10 also includes a brake hydraulic pressure control section 20 for controlling brake hydraulic pressures supplied to the brake units 11, 12 and the brake units 13, 14 (more specifically, the wheel cylinders Wfr, Wfl, Wrl, Wrr).

As schematically shown in FIG. 2, the brake hydraulic pressure control section 20 includes a brake hydraulic pressure generation section 21 which generates a brake hydraulic pressure corresponding to an operation force applied to a brake pedal BP; an FR brake hydraulic pressure adjustment section 22 and an FL brake hydraulic pressure adjustment section 23 which can respectively adjust brake hydraulic pressures supplied to the wheel cylinders Wfr, Wfl, which operate the calipers of the brake units 11, 12; an RL brake hydraulic pressure adjustment section 24 and an RR brake hydraulic pressure adjustment section 25 which can respectively adjust brake hydraulic pressures supplied to the wheel cylinders Wrl, Wrr, which operate the brake shoes of the brake units 13, 14; and a return brake fluid supply section 26.

The brake hydraulic pressure generation section 21 is composed of a vacuum booster VB which operates in response to operation of the brake pedal BP, and a master cylinder MC which is linked to the vacuum booster VB. The vacuum booster VB utilizes the pressure (negative pressure) of air within the intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure.

The first port of the master cylinder MC is connected to the upstream side of the FR brake hydraulic pressure adjustment section 22 and the upstream side of the RL brake hydraulic pressure adjustment section 24, whereby the first master cylinder hydraulic pressure is supplied to the upstream sides of the FR brake hydraulic pressure adjustment section 22 and the RL brake hydraulic pressure adjustment section 24. Similarly, the second port of the master cylinder MC is connected to the upstream side of the FL brake hydraulic pressure adjustment section 23 and the upstream side of the RR brake hydraulic pressure adjustment section 25, whereby the second master cylinder hydraulic pressure is supplied to the upstream sides of the FL brake hydraulic pressure adjustment section 23 and the RR brake hydraulic pressure adjustment section 25.

The FR brake hydraulic pressure adjustment section 22 consists of a pressure-increasing valve PUfr, which is a normally-open solenoid valve of a 2-port, 2-position type, and a pressure-reducing valve PDfr, which is a normally-closed solenoid valve of a 2-port, 2-position type. The pressure-increasing valve PUfr establishes communication between the upstream side of the FR brake hydraulic pressure adjustment section 22 and the wheel cylinder Wfr when the pressure-increasing valve PUfr is in a first position shown in FIG. 2 (position in an unexcited state). The pressure-increasing valve PUfr breaks communication between the upstream side of the FR brake hydraulic pressure adjustment section 22 and the wheel cylinder Wfr when the pressure-increasing valve PUfr is in a second position (position in an excited state). The pressure-reducing valve PDfr breaks communication between the wheel cylinder Wfr and a reservoir RS1 when the pressure-reducing valve PDfr is in a first position shown in FIG. 2 (position in an unexcited state). The pressure-reducing valve PDfr establishes communication between the wheel cylinder Wfr and the reservoir RS1 when the pressure-reducing valve PDfr is in a second position (position in an excited state).

When both the pressure-increasing valve PUfr and the pressure-reducing valve PDfr are in their first positions, the brake fluid at the upstream side of the FR brake hydraulic pressure adjustment section 22 is supplied to the wheel cylinder Wfr, whereby the brake hydraulic pressure within the wheel cylinder Wfr is increased. When the pressure-increasing valve PUfr is in the second position and the pressure-reducing valve PDfr is in the first position, the brake hydraulic pressure within the wheel cylinder Wfr is maintained irrespective of the brake hydraulic pressure on the upstream side of the FR brake hydraulic pressure adjustment section 22. When both the pressure-increasing valve PUfr and the pressure-reducing valve PDfr are in their second positions, the brake fluid within the wheel cylinder Wfr is returned to the reservoir RS1, whereby the brake hydraulic pressure within the wheel cylinder Wfr is decreased.

In addition, a check valve CV1 is provided for the pressure-increasing valve PUfr. The check valve CV1 is configured to allow flow of the brake fluid in only one direction from the wheel cylinder Wfr side toward the FR brake hydraulic pressure adjustment section 22. Therefore, when the operating force (stepping force) applied to the brake pedal BP decreases, the brake hydraulic pressure within the wheel cylinder Wfr is quickly reduced through operation of the check valve CV1.

Similarly, the FL brake hydraulic pressure adjustment section 23, the RL brake hydraulic pressure adjustment section 24, and the RR brake hydraulic pressure adjustment section 25 are composed of a pressure-increasing valve PUfl and a pressure-reducing valve PDfl, a pressure-increasing valve PUrl and a pressure-reducing valve PDrl, and a pressure-increasing valve PUrr and a pressure-reducing valve PDrr, respectively. By means of controlling the positions of the pressure-increasing valves and the pressure-reducing valves in the above-described manner, the brake hydraulic pressures within the wheel cylinder Wfl, the wheel cylinder Wrl, and the wheel cylinder Wrr are increased, maintained, or decreased, respectively. Check valves CV2, CV3, and CV4 are provided in parallel with the pressure-increasing valves PUrl, PDrl, and PDrr, respectively, to provide the same function as that of the check valve CV1.

The return brake fluid supply section 26 includes a DC motor MT, and two hydraulic pumps HP1 and HP2 simultaneously driven by the motor MT. The hydraulic pump HP1 pumps the brake fluid returned from the pressure-reducing valves PDfr and PDrl to the reservoir RS1, and supplies the pumped brake fluid to the upstream sides of the FR brake hydraulic pressure adjustment section 22 and the RL brake hydraulic pressure adjustment section 24 via check valves CV5 and CV6. Similarly, the hydraulic pump HP2 pumps the brake fluid returned from the pressure reducing valves PDfl and PDrr to the reservoir RS2, and supplies the pumped brake fluid to the upstream sides of the FL brake hydraulic pressure adjustment section 23 and the RR brake hydraulic pressure adjustment section 25 via check valves CV7 and CV8.

The brake hydraulic pressure control section 20 configured as described above supplies a brake hydraulic pressure corresponding to the operation force applied to the brake pedal BP (quantity of a driver's braking operation) to the wheel cylinders Wfl, Wfr, Wrl, and Wrr when all the solenoid valves are located at their first positions. Furthermore, the brake hydraulic pressure control section 20 can control the brake hydraulic pressures within the wheel cylinders Wfl, Wfr, Wrl, and Wrr independently of one another. For example, the brake hydraulic pressure control section 20 can decrease (by a predetermined amount), maintain, or increase (by a predetermined amount) only the brake hydraulic pressure within the wheel cylinder Wfr by controlling the pressure-increasing valve PUfr and the pressure-reducing valve PDfr. Therefore, the brake units 11, 12, 13, and 14 can individually apply frictional braking forces to the left and right front wheels FW1, FW2 and the left and right rear wheels RW1, RW2.

Figure 3:
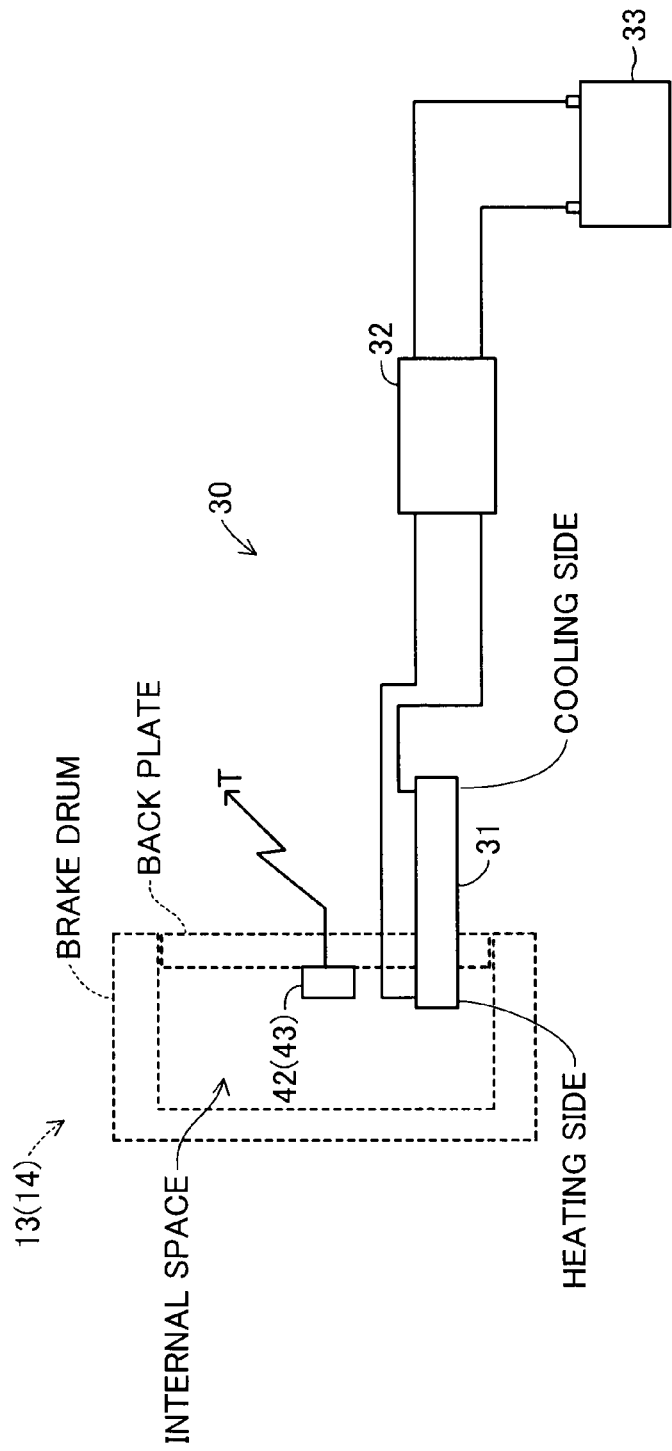
FIG. 3 is a schematic diagram showing the configuration of an electric power collection section of FIG. 1.

Furthermore, the vehicular braking apparatus 10 includes an electric power collection section 30, which serves as heat collection means for collecting thermal energy and converting the collected thermal energy to electric energy. As shown in FIG. 3, the electric power collection section 30 includes a thermoelectric conversion section 31 which is assembled to each of the back plates of the brake units 13, 14 provided for the left and right rear wheels RW1, RW2. Thus, in the present embodiment, the brake units 13, 14 provided for the left and right rear wheels RW1, RW2 serve as the first braking force application means of the present invention, and the brake units 11, 12 provided for the left and right front wheels FW1, FW2 serve as the second braking force application means of the present invention.

The thermoelectric conversion section 31 converts thermal energy to electric energy by making use of a well-known Seebeck effect of a substance (specifically, semiconductor), and includes a Peltier device as a main component. As shown in FIG. 3, the thermoelectric conversion section 31 is assembled to extend through the back plate such that one end (heating side) of the thermoelectric conversion section 31 is located within the internal space of the brake unit 13 (14), and the other end (cooling side) thereof is always exposed to the outside air.

Thermoelectric conversion effected by the thermoelectric conversion section 31 assembled in the above-described manner will be described briefly. Since the brake units 13, 14 are drum brake units as described above, when frictional braking forces are applied to the left and right rear wheels RW1, RW2, the temperature within the internal space of each brake unit increases due to the generated friction heat. In this case, since the internal space is not exposed directly to the outside air, the elevated temperature changes only slightly (specifically, is unlikely to decrease), and is maintained.

Thus, the heating side of the thermoelectric conversion section 31 located within the internal space is quickly heated, and is maintained in a heated state. Meanwhile, the cooling side of the thermoelectric conversion section 31 always exposed to the outside air is maintained in a cooled state established by traveling wind generated as a result of traveling of the vehicle. Since one end of the thermoelectric conversion section 31 is heated and the other end thereof is cooled, by virtue of the well-known Seebeck effect, the thermoelectric conversion section 31 generates an electromotive force corresponding to the temperature difference between the heating side and the cooling side. That is, the thermoelectric conversion section 31 can collect the friction heat (thermal energy) generated as a result of braking of the left and right rear wheels RW1, RW2, and convert it to electric energy.

Electric energy (electromotive force) converted from thermal energy by the thermoelectric conversion section 31 is supplied, via a voltage transformation circuit 32, to a battery 33, which serves as power storage means. The voltage transformation circuit 32 is an electric circuit which includes, for example, a DC-DC converter and a capacitor as main components. The voltage transformation circuit 32 changes the voltage of the electromotive force output from the thermoelectric conversion section 31 (hereinafter this electromotive force will be referred to as "regenerative electric power") and outputs the regenerative electric power to the battery 33. The battery 33 stores the regenerative electric power output from the voltage transformation circuit 32.

Moreover, the vehicular braking apparatus 10 includes a group of various sensors 40 in order to control operation of the brake hydraulic pressure control section 20 (more specifically, the brake units 11, 12, 13, 14).

As shown in FIG. 1, the sensor group 40 is composed of a longitudinal acceleration sensor 41, temperature sensors 42, 43, a brake pedal operation sensor 44, and a vehicle speed sensor 45. The longitudinal acceleration sensor 41 detects acceleration G (deceleration G) in the front-back direction (longitudinal direction) of the vehicle, and outputs a signal representing the detected acceleration G (deceleration G). Notably, when the vehicle is accelerating frontward, the acceleration G detected by the longitudinal acceleration sensor 41 assumes a positive value (the detected deceleration G assumes a negative value); and, when the vehicle is decelerating; i.e., accelerating rearward, the acceleration G detected by the longitudinal acceleration sensor 41 assumes a negative value (the detected deceleration G assumes a positive value).

The temperature sensors 42, 43, which serve as temperature detection means, are assembled to the brake units 13, 14, respectively. As shown in FIG. 3, each of the temperature sensors 42, 43 detects the temperature T within the internal space which changes as a result of application of frictional braking force by the brake unit 13, 14, and outputs a signal representing the detected temperature T. Each of the temperature sensors 42, 43 outputs the signal representing the detected temperature T via an unillustrated transmitter and an unillustrated receiver. The brake pedal operation sensor 44 outputs an operation signal representing a braking operation quantity (e.g., operation stroke, operation force, operation speed, or the like) of the brake pedal BP operated by the driver. The vehicle speed sensor 45 detects speed V of the vehicle, and outputs a signal representing the detected vehicle speed V.

As shown in FIG. 1, these sensors 41 to 45 are connected to an electronic control unit 51 of an electric control apparatus 50. The electronic control unit 51 includes a CPU, ROM, RAM, etc. as main components, and controls operations of the brake units 11, 12, 13, and 14 by executing various programs including a program which will be described later. Therefore, a drive circuit 52 which operates and controls the brake hydraulic pressure control section 20 is connected to the output side of the electronic control unit 51.

Furthermore, the electronic control unit 51 includes an interface 53 for communicating with a vehicle behavior stabilization apparatus 60, which suppresses unstable behavior of the vehicle during turning or braking of the vehicle. The vehicle behavior stabilization apparatus 60 is an apparatus for suppressing unstable vehicle behavior by properly changing the braking forces applied to the left and right front wheels FW1, FW2 and the left and right rear wheels RW1, RW2 by the brake unit 11, 12, 13, and 14. Examples of such an apparatus include an apparatus for correcting oversteer or understeer which would otherwise occur when the vehicle turns, and an apparatus for preventing sideslip of the left and right front wheels FW1, FW2 and the left and right rear wheels RW1, RW2 which would otherwise occur when the vehicle is braked. When such unstable vehicle behavior must be restrained, the vehicle behavior stabilization apparatus 60 outputs an operation signal to the electronic control unit 51 via the interface 53.

The vehicular braking apparatus 10 having the above-described configuration operates as follows. When a driver operates the brake pedal BP, the electronic control unit 51 acquires a braking request signal output from the brake pedal operation sensor 44. On the basis of the braking operation quantity of the brake pedal BP represented by the braking request signal, the electronic control unit 51 determines a braking force demanded by the driver; i.e., determines a target deceleration Gd of the vehicle. Notably, the target deceleration Gd of the vehicle is determined on the basis of the braking operation quantity of the brake pedal BP and a predetermined relation therebetween such that the target deceleration Gd increases as the braking operation quantity increases. Once the target deceleration Gd of the vehicle is determined, the electronic control unit 51 acquires the deceleration G detected by the longitudinal acceleration sensor 41, and controls the operation of the brake hydraulic pressure control section 20 such that the detected deceleration G becomes equal to the target deceleration Gd. Thus, proper brake hydraulic pressures are supplied to the wheel cylinders Wfl, Wfr, Wrl, Wrr, whereby the brake units 11, 12, 13, 14 operate so as to apply braking forces to the left and right front wheels FW1, FW2 and the left and right rear wheels RW1, RW2.

In particular, at each of the left and right rear wheels RW1, RW2, the temperature T within the internal space increases as a result of frictional engagement between the brake drum and the brake shoes for generation of the braking force. As a result, the thermoelectric conversion section 31 of the electric power collection section 30 is heated on its heating side and cooled on its cooling side, and outputs a regenerative electric power corresponding to the temperature difference between the heating side and the cooling side.

Incidentally, the thermoelectric conversion section 31 generates regenerative electric power corresponding to the temperature difference between the heating side and the cooling side. Therefore, the thermoelectric conversion section 31 has a strong temperature dependency with respect to the efficiency of conversion from thermal energy to electric energy. Therefore, from the viewpoint of conversion efficiency, it is very important to heat the heating side to a proper temperature in accordance with the temperature characteristic of a substance (semiconductor) which forms the thermoelectric conversion section 31.

Figure 4:
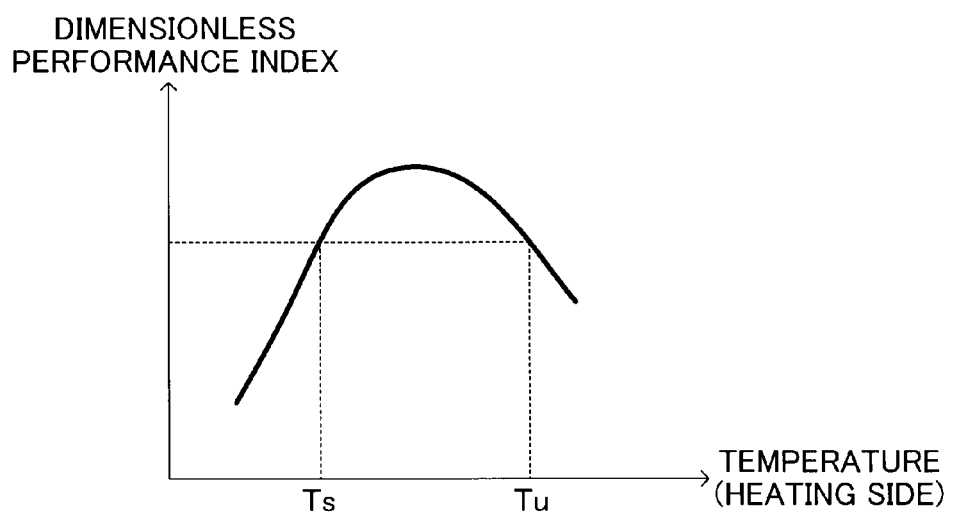
FIG. 4 is a graph for describing the temperature characteristic of a thermoelectric conversion section.

In this regard, in general, a thermoelectric figure of merit calculated from the thermal conductivity and resistivity of the substance and a Seebeck coefficient peculiar to the substance can be used as a performance index of a thermoelectric conversion element (the thermoelectric conversion section 31) utilizing the Seebeck effect. Furthermore, as schematically shown in FIG. 4, a dimensionless performance index, which is obtained by multiplying the thermoelectric figure of merit by temperature, can be used as a parameter which represents the temperature characteristic of the thermoelectric conversion element. Accordingly, in general, the temperature characteristic, that is, a temperature region in which the thermoelectric conversion element is excellent in conversion efficiency, is determined on the basis of the dimensionless performance index, and the heating side of the thermoelectric conversion element (the thermoelectric conversion section 31) is heated to fall within this temperature region, whereby an excellent conversion efficiency can be attained. Notably, in the following description, the temperature region in which the thermoelectric conversion element is excellent in conversion efficiency will be referred to as an optimum temperature region.

Therefore, the electronic control unit 51 adjusts the amount of the friction heat generated as a result of friction engagement between the brake drum and the brake shoes, in accordance with the temperature T within the internal space of the brake unit 13, 14 in which the heating side of the thermoelectric conversion section 31 exists. That is, for the total braking force required to realize the target deceleration Gd of the vehicle determined as described above, the electronic control unit 51 changes a braking force distribution; that is, a proportion (ratio) of braking forces applied to the left and right front wheels FW1, FW2 by the brake units 11, 12, and a proportion (ratio) of braking forces applied to the left and right rear wheels RW1, RW2 by the brake units 13, 14. In the below description, changing of this braking force distribution will be described in detail. Notably, in the present embodiment, for changing the braking force distribution, an EBD (Electronic Brake force Distribution) control which has been widely known heretofore is utilized. Notably, since the details of the EBD control do not relate directly to the present invention, its detailed description is omitted.

Figure 5:
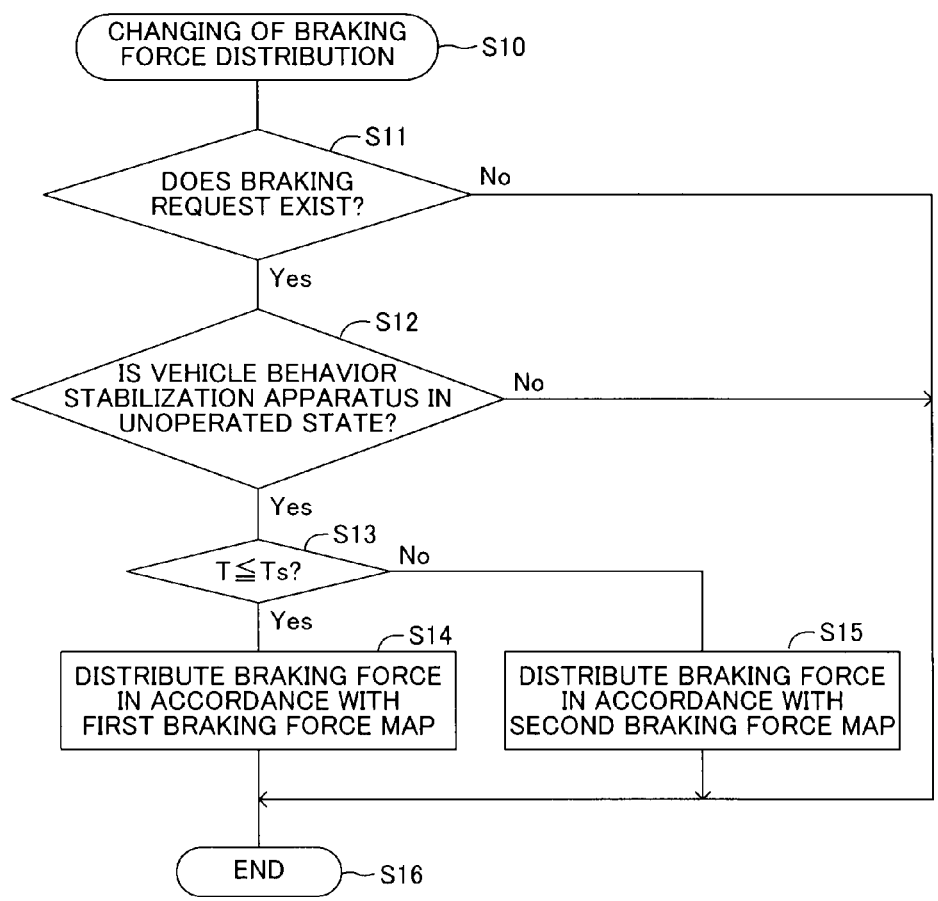
FIG. 5 is a flowchart relating to the first embodiment of the present invention and showing a braking-force-distribution changing program executed by an electronic control unit of FIG. 1.

The electronic control unit 51 executes a braking-force-distribution changing program shown in FIG. 5. That is, after having executed an unillustrated predetermined initialization program, the electronic control unit 51 starts the execution of the braking-force-distribution changing program at step S10. In step S11 subsequent thereto, the electronic control unit 51 determines whether or not the vehicle must be braked; i.e., whether or not braking is requested by a driver. Specifically, the electronic control unit 51 determines whether or not the brake pedal BP is operated by the driver; in other words, whether or not the braking request signal is input from the brake pedal operation sensor 44. When the braking request signal is input from the brake pedal operation sensor 44, the vehicle must be braked (a braking request exists). Therefore, the electronic control unit 51 makes a "Yes" determination, and then proceeds to step S12. Meanwhile, when the braking request signal is not input from the brake pedal operation sensor 44, the vehicle is not required to be braked (a braking request does not exist). Therefore, the electronic control unit 51 makes a "No" determination, and ends the current execution of the program in step S16.

In step S12, the electronic control unit 51 determines whether or not the vehicle behavior stabilization apparatus 60 is stopped (where or not the behavior stabilization apparatus 60 is in an un-operated state). That is, when the electronic control unit 51 receives an operation signal from the vehicle behavior stabilization apparatus 60 via the interface 53, the electronic control unit 51 makes a "No" determination, and proceeds to step S16 so as to end the current execution of the program in step S16. In this case, in accordance with a request output from the operating vehicle behavior stabilization apparatus 60 so as to stabilize the vehicle behavior, the electronic control unit 51 operates and controls the brake hydraulic pressure control section 20 to thereby operate the brake units 11, 12, 13, 14 provided for the left and right front wheels FW1, FW2 and the left and right rear wheels RW1, RW2. Meanwhile, when the electronic control unit 51 does not receive an operation signal from the vehicle behavior stabilization apparatus 60 via the interface 53, the electronic control unit 51 makes a "Yes" determination, and proceeds to step S13.

In step S13, the electronic control unit 51 determines whether or not each of the temperatures T detected by the temperature sensors 42, 43 assembled to the brake units 13, 14 of the left and right rear wheels RW1, RW2 is equal to or lower than a previously set, predetermined temperature Ts. The temperature Ts is determined on the basis of the dimensionless performance index shown in FIG. 4 such that the temperature Ts coincides with the lower limit temperature of the above-mentioned optimum temperature range. When each of the detected temperatures T is equal or lower than the predetermined temperature Ts, the electronic control unit 51 makes a "Yes" determination, and proceeds to step S14.

Figure 6:
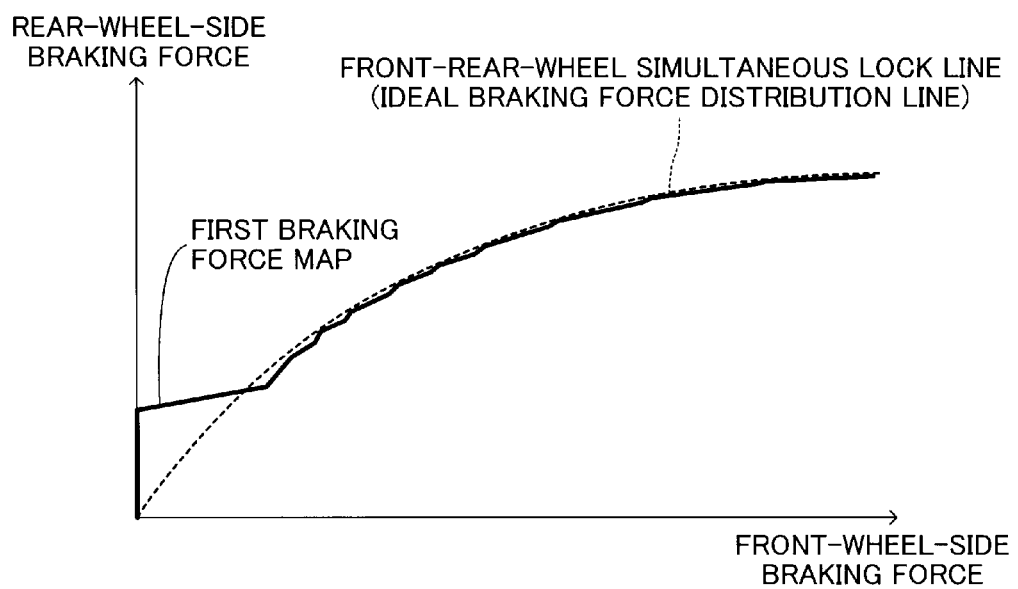
FIG. 6 is a graph for describing a first braking map representing the ratio between front-wheel-side braking force and rear-wheel-side braking force.

In step S14, in order to actively increase the internal space temperatures T of the brake units 13, 14, the electronic control unit 51 sets the braking force distribution in accordance with a first braking force map indicated by a solid line in FIG. 6 such that the proportion (ratio) of the braking forces of the brake units 13, 14 becomes greater than the proportion (ratio) of the braking forces of the brake units 11, 12, to thereby operate the brake units 13, 14 preferentially. Specifically, the electronic control unit 51 creates a state in which the left and right rear wheels RW1, RW2 are likely to lock prior to the remaining wheels, as contrasted with a state in which the front and rear wheels lock simultaneously, which is indicated by a broken line in FIG. 6 (a front-rear-wheel simultaneous lock line or an ideal braking force distribution line). That is, the electronic control unit 51 operates only the brake units 13, 14 in accordance with the first braking force map such that the braking forces applied to the left and right rear wheels RW1, RW2 become greater than that represented by the front-rear-wheel simultaneous lock line. Thus, braking forces are first applied to the left and right rear wheels RW1, RW2. In other words, in this case, the proportion of the braking forces generated by the brake units 11, 12 is rendered zero.

For such a control, the electronic control unit 51 operates the brake hydraulic pressure control section 20 by supplying predetermined drive currents thereto via the drive circuit 52. In the brake hydraulic pressure control section 20, by making use of the supplied predetermined drive currents, the FR brake hydraulic pressure adjustment section 22 and the FL brake hydraulic pressure adjustment section 23 switch the pressure-increasing valve PUfr and the pressure-reducing valve PDfr, and the pressure-increasing valve PUfl and the pressure-reducing valve PDfl to their excited states (their second positions). With this operation, the brake fluid within the wheel cylinder Wfr and the wheel cylinder Wfl is returned to the reservoir RS1, whereby the brake hydraulic pressures within the wheel cylinder Wfr and the wheel cylinder Wfl are reduced. Accordingly, the brake units 11, 12 apply no braking force to the left and right front wheels FW1, FW2.

Meanwhile, the RL brake hydraulic pressure adjustment section 24 and the RR brake adjustment section 25 maintain the pressure-increasing valve PUrl and the pressure-reducing valve PDrl, and the pressure-increasing valve PUrr and the pressure-reducing valve PDrr in their unexcited states (their first positions). With this operation, the brake fluid at the upstream sides of the RL brake hydraulic pressure adjustment section 24 and the RR brake adjustment section 25 is supplied to the wheel cylinder Wrl and the wheel cylinder Wrr, whereby the brake hydraulic pressures within the wheel cylinder Wrl and the wheel cylinder Wrr are increased. Accordingly, the brake units 13, 14 apply braking forces to the left and right rear wheels RW1, RW2.

As a result of the brake units 13, 14 applying braking forces to the left and right rear wheels RW1, RW2 as described above, in each of the brake units 13, 14, the brake shoes are pressed against the corresponding brake drum, and friction heat is generated, whereby the internal space temperature T increases. As a result, the internal space temperature T becomes higher than the predetermined temperature Ts, and the heating side of the thermoelectric conversion section 31 is heated to the optimum temperature range. Therefore, the electric power collection section 30 (more specifically, the thermoelectric conversion section 31) can generate regenerative electric power at a satisfactory conversion efficiency, and store the electric power.

Furthermore, since the internal spaces of the brake units 13, 14 are not exposed directly to the outside air, the temperature T can be maintained (kept) well. Accordingly, in each of the internal spaces, the temperature T can be maintained in the optimum temperature range over a relatively long period of time. Thus, the electric power collection section 30 (more specifically, the thermoelectric conversion section 31) can continuously generate and store regenerative electric power irrespective of the operations of the brake units 13, 14.

Incidentally, in the case where the left and right rear wheels RW1, RW2 are preferentially braked as described above, if the magnitude of the demanded deceleration Gd is small, application of braking forces only to the left and right rear wheels RW1, RW2 results in only a small influence on a change in vehicle behavior. Furthermore, by means of the braking forces applied only to the left and right rear wheels RW1, RW2 by the brake units 13, 14, the magnitude of deceleration generated in the vehicle can be rendered greater than the demanded deceleration Gd. However, if the magnitude of the demanded deceleration Gd is large, in general, vehicle behavior becomes unstable, because, when the left and right rear wheels RW1, RW2 are preferentially braked, the left and right rear wheels RW1, RW2 enter a locked state prior to the left and right front wheels FW1, FW2. Moreover, when the magnitude of the demanded deceleration Gd is greater than the magnitude of the deceleration generated in the vehicle by means of the braking forces applied to the left and right rear wheels RW1, RW2 by the brake units 13, 14, the brake units 11, 12 must be operated so as to apply braking forces to the left and right front wheels FW1, FW2 as well.

Therefore, when the magnitude of the demanded deceleration Gd is large and braking forces must be applied to the left and right front wheels FW1, FW2 as well, in accordance with the first braking force map shown in FIG. 6, the electronic control unit 51 first operates the brake units 13, 14 until a predetermined braking force (corresponding to a predetermined deceleration) is attained whereby braking forces are applied only to the left and right rear wheels RW1, RW2. After that, the electronic control unit 51 operates the brake units 11, 12 for the left and right front wheels FW1, FW2 through EBD control.

Notably, in this case, in the brake hydraulic pressure control section 20, the FR brake hydraulic pressure adjustment section 22 and the FL brake hydraulic pressure adjustment section 23 switch the pressure-increasing valve PUfr and the pressure-reducing valve PDfr, and the pressure-increasing valve PUfl and the pressure-reducing valve PDfl to their unexcited states (their first positions). As a result, the brake fluid at the upstream sides of the FR brake hydraulic pressure adjustment section 22 and the FL brake hydraulic pressure adjustment section 23 is supplied to the wheel cylinder Wfr and the wheel cylinder Wfl, whereby the brake hydraulic pressures within the wheel cylinder Wfr and the wheel cylinder Wfl are increased. Accordingly, the brake units 11, 12 apply braking forces to the left and right front wheels FW1, FW2.

With this operation, the braking state changes from a state in which braking forces are applied only to the left and right rear wheels RW1, RW2 to a state in which the braking forces applied to the left and right front wheels FW1, FW2 are increased. In other words, in relation to the total braking force required to realize the demanded deceleration Gd, the proportion (ratio) of the braking forces of the brake units 13, 14 is decreased relatively, and the proportion (ratio) of the braking forces of the brake units 11, 12 is increased relatively. Thus, the braking state can be changed from a state in which the left and right rear wheels RW1, RW2 are caused to lock prior to the front wheels to an ordinary state in which the left and right front wheels FW1, FW2 are caused to lock prior to the rear wheels. Accordingly, even when the magnitude of the demanded deceleration Gd is large, the internal space temperature T can be increased by means of applying braking forces to the left and right rear wheels RW1, RW2 preferentially, and the vehicle can be braked without making the vehicle behavior unstable.

In the EBD control, operations of the FR brake hydraulic pressure adjustment section 22, the FL brake hydraulic pressure adjustment section 23, the RL brake hydraulic pressure adjustment section 24, and the RR brake adjustment section 25 in the brake hydraulic pressure control section 20 are controlled at short time intervals so as to increase or maintain, or decrease or maintain the brake hydraulic pressure within each wheel cylinder Wfr to Wrr. Therefore, in the case where the proportion of the braking forces generated by the brake units 13, 14 and the proportion of the braking forces generated by the brake units 11, 12 are changed by making use of the EBD control, for example, the proportions are changed such that, as indicated by a solid line in FIG. 6, a line representing the ratio between the braking forces generated by the brake units 13, 14 and the braking forces generated by the brake units 11, 12 gradually approaches the front-rear-wheel simultaneous lock line (ideal braking force distribution line) indicated by a broken line. With this operation, the vehicle can be braked in a stable state.

Referring back to the flowchart of FIG. 5, when the electronic control unit 51 determines in step S13 that each of the detected temperatures T is higher than the predetermined temperature Ts, the electronic control unit 51 makes a "No" determination, and proceeds to step S15.

Figure 7:
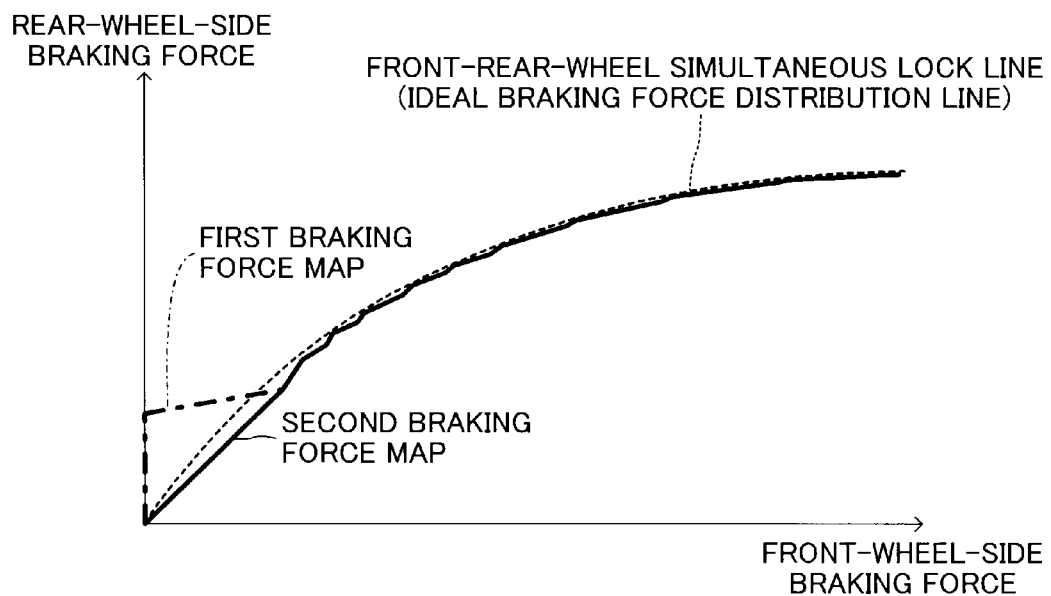
FIG. 7 is a graph for describing a second braking map representing the ratio between front-wheel-side braking force and rear-wheel-side braking force.

In step S15, the electronic control unit 51 applies braking forces to the left and right front wheels FW1, FW2 and the left and right rear wheels RW1, RW2 by referring to a second braking force map indicated by a solid line in FIG. 7. That is, in this case, the internal space temperatures T of the brake units 13, 14 for the left and right rear wheels RW1, RW2 have already become higher than the predetermined temperature Ts, and the thermoelectric conversion section 31 can perform thermoelectric conversion efficiently. If the internal space temperatures T of the brake units 13, 14 increase excessively; in other words, if the heating side of the thermoelectric conversion section 31 is heated excessively, as is apparent from the dimensionless performance index shown in FIG. 4, the thermoelectric conversion efficiency drops. Furthermore, when the internal space temperatures T of the brake units 13, 14 increase excessively, the brake units 13, 14 may suffer a fading phenomenon.

Therefore, through switching from the first braking force map shown in FIG. 6 to the second braking force map shown in FIG. 7, the electronic control unit 51 sets the proportion (ratio) of the braking forces of the brake units 11, 12 for the left and right front wheels FW1, FW2 in relation to the total braking force required to realize the demanded deceleration Gd, such that it becomes greater than the proportion (ratio) of the braking forces of the brake units 13, 14 for the left and right rear wheels RW1, RW2. Thus, the electronic control unit 51 prevents a further increase in the internal space temperatures of the brake units 13, 14, and prevents the brake units 13, 14 from suffering a fading phenomenon.

More specifically, in accordance with the second braking force map, the electronic control unit 51 mainly operates the brake units 11, 12 for the left and right front wheels FW1, FW2, whereby the braking forces of the brake units 13, 14 for the left and right rear wheels RW1, RW2 are rendered relatively small. In other words, in this case, through the EBD control, the electronic control unit 51 creates a state in which the left and right front wheels FW1, FW2 lock prior to the rear wheels. With this control, the brake units 11, 12 (disc brakes), which are excellent in cooling, mainly produce braking forces for decelerating the vehicle, to thereby reduce the operation frequencies of the brake units 13, 14 (drum brakes), which are excellent in heat retention.

After changing the braking force distribution; i.e., the proportion of the braking forces of the brake units 11, 12 and the proportion of the braking forces of the brake units 13, 14, the electronic control unit 51 ends the current execution of the program in step S16.

As can be understood from the above description, according to this first embodiment, the thermoelectric conversion section 31, which constitutes the electric power collection section 30, can be provided in the brake units 13, 14, which are excellent in heat retention. Through execution of the braking-force-distribution changing program, the electronic control unit 51 operates the brake units 13, 14 preferentially in accordance with the first braking force map to thereby apply braking forces to the left and right rear wheels RW1, RW2, when the detected temperature T of the inner space of each brake unit 13, 14 is equal to or lower than the predetermined temperature Ts; i.e., when a predetermined condition is satisfied.

With this operation, by means of the friction heat generated as a result of friction engagement between the brake drum and the brake shoes of each brake unit 13, 14, the internal space temperatures T can be increased quickly. Therefore, the thermoelectric conversion section 31 can collect the friction heat (thermal energy), and convert it to regenerative electric power (electric energy) efficiently. The predetermined temperature Ts can be determined on the basis of the dimensionless performance index of the thermoelectric conversion section 31. Therefore, the conversion efficiency of the thermoelectric conversion section 31 can be improved by using the predetermined temperature Ts as a reference.

Meanwhile, when the detected temperature T of the inner space of each brake unit 13, 14 is higher than the predetermined temperature Ts, the electronic control unit 51 can change the braking force distribution in accordance with the second braking force map such that the proportion (ratio) of the braking forces of the brake units 11, 12 to the total braking force required to realize the demanded deceleration Gd becomes greater than the proportion (ratio) of the braking forces of the brake units 13, 14 to the total braking force. As a result, the detected temperature T of the internal space of each brake unit 13, 14 can be prevented from increasing excessively, and the brake units 13, 14 can be prevented from suffering a fading phenomenon. Thus, the thermoelectric conversion section 31 can convert thermal energy to electric energy efficiently, to thereby generate regenerative electric power. Meanwhile, since braking forces are applied to the left and right front wheels FW1, FW2 by operating the brake units 11, 12, which are excellent in cooling; i.e., changing the braking force distribution such that the proportion (ratio) of the braking forces of the brake units 11, 12 to the total braking force increases, the vehicle can be decelerated by applying proper braking forces to the wheels without making the vehicle behavior unstable.

Accordingly, the braking apparatus 10 according to the first embodiment can properly apply braking forces to the left and right front wheels FW1, FW2 and the left and right rear wheels RW1, RW2, to thereby decelerate the vehicle stably. Additionally, the thermal energy generated as a result of braking can be collected efficiently. As a result, the thermal energy can converted to electric energy efficiently so as to generate regenerative electric power. That is, the braking apparatus 10 according to the first embodiment can satisfy a conflicting requirement of improving the conversion efficiency of the thermoelectric conversion section 31 without decreasing the braking forces produced by the brake units 11, 12, 13, 14.

b. Second Embodiment

In the above-described first embodiment, the present invention is embodied in such a manner that, when the internal space temperatures T of the brake units 13, 14 provided for the left and right rear wheels RW1, RW2 are lower than the predetermined temperature (reference temperature) Ts, which is set to coincide with the lower limit temperature of the optimum temperature range, the first braking force map shown in FIG. 6 is employed so as to operate the brake units 13, 14 preferentially, to thereby cause the internal space temperatures T to quickly exceed the predetermined temperature Ts. However, the present invention may be embodied as follows. On the basis of the dimensionless performance index shown in FIG. 4, the upper limit temperature of the optimum temperature range may be set as a previously set, predetermined temperature Tu; and, when the internal space temperatures T of the brake units 13, 14 exceed this predetermined temperature Tu, the brake units 11, 12 provided for the left and right front wheels FW1, FW2 are operated preferentially. In the below description, this second embodiment will be described in detail.

Figure 8:
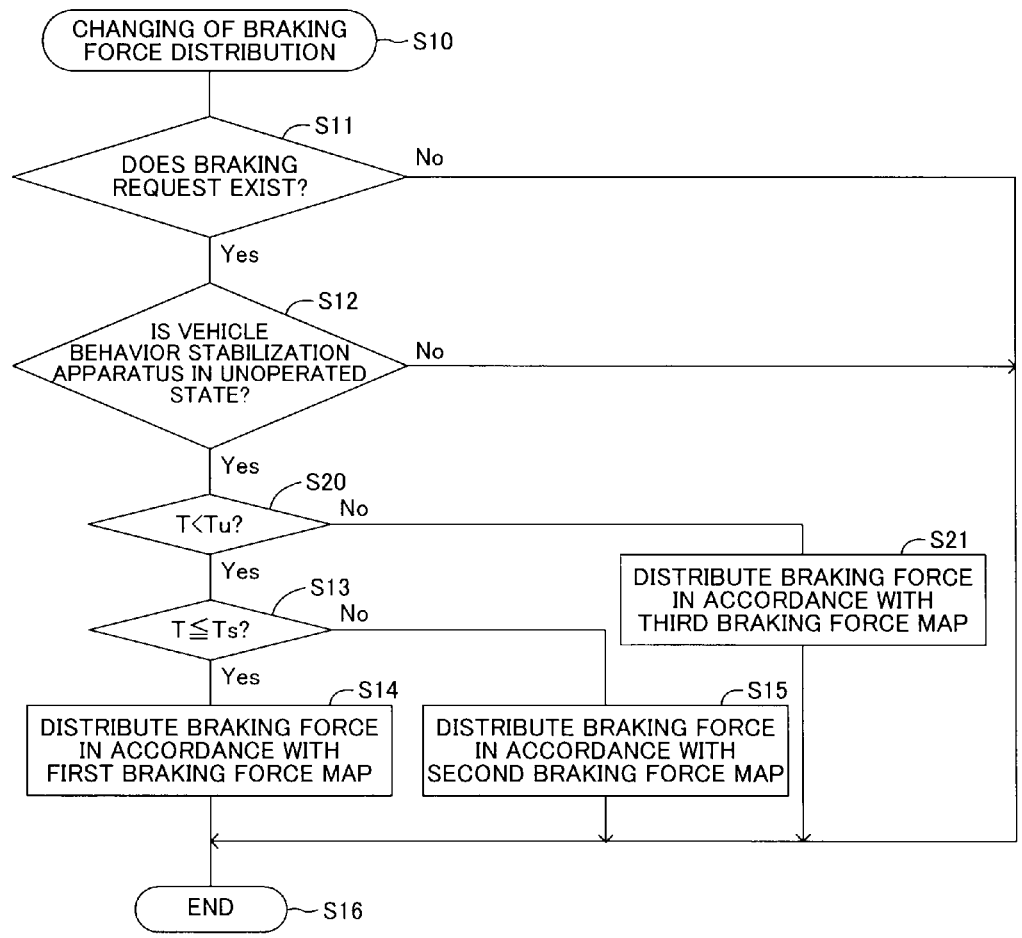
FIG. 8 is a flowchart relating to the second embodiment of the present invention and showing a braking-force-distribution changing program executed by the electronic control unit of FIG. 1.

In this second embodiment, the electronic control unit 51 executes a braking-force-distribution changing program shown in FIG. 8. That is, the braking-force-distribution changing program used in the second embodiment differs from the braking-force-distribution changing program used in the above-described first embodiment in that steps S20 and S21 are added. Therefore, in the following description, the same portions as those of the first embodiment are dented by the same reference numerals, and their detailed descriptions are not provided.

In this second embodiment as well, the electronic control unit 51 starts the execution of the braking-force-distribution changing program in step S10. The electronic control unit 51 then determines in step S11 whether or not the driver requests braking, and determines in step S12 whether or not the vehicle behavior stabilization apparatus 60 is in an unoperated state. Subsequently, the electronic control unit 51 proceeds to step S20.

In step S20, the electronic control unit 51 determines whether or not each of the temperatures T detected by the temperature sensors 42, 43 attached to the brake units 13, 14 for the left and right rear wheels RW1, RW2 is equal to or higher than the predetermined temperature Tu, which is set as an upper limit temperature in advance. When each of the detected temperatures T is higher than the predetermined temperature Tu, in order to prevent temperature increases within internal spaces of the brake units 13, 14, the electronic control unit 51 set the braking force distribution in accordance with a third braking force map indicated by a solid line in FIG. 9 such that the proportion (ratio) of the braking forces of the brake units 11 12 becomes greater than the proportion (ratio) of the braking forces of the brake units 13, 14, whereby the brake units 11, 12 are operated preferentially. Specifically, the electronic control unit 51 operates only the brake units 11, 12 in accordance with the third braking force map so as to apply braking forces to the left and right front wheels FW1, FW2. That is, in this case, the proportion of the braking forces generated by the brake units 13, 14 is rendered zero.

For such a control, the electronic control unit 51 operates the brake hydraulic pressure control section 20 by supplying predetermined drive currents thereto via the drive circuit 52. In the brake hydraulic pressure control section 20, by making use of the supplied predetermined drive currents, the RL brake hydraulic pressure adjustment section 24 and the RR brake hydraulic pressure adjustment section 25 switch the pressure-increasing valve PUrl and the pressure-reducing valve PDrl, and the pressure-increasing valve PUrr and the pressure-reducing valve PDrr to their excited states (their second positions). With this operation, the brake fluid within the wheel cylinder Wrl and the wheel cylinder Wrr is returned to the reservoir RS2, whereby the brake hydraulic pressures within the wheel cylinder Wrl and the wheel cylinder Wrr are reduced. Accordingly, the brake units 13, 14 apply no braking force to the left and right rear wheels RW1, RW2.

By virtue of such operation, in the brake units 13, 14, frictional engagements between the brake drums and the brake shoes are broken, whereby generation of friction heat is suppressed. Accordingly, the internal space temperatures T are maintained in the optimum temperature range, whereby the electric power collection section 30 can covert thermal energy to electric energy continuously and efficiently, and can store regenerative electric power.

Meanwhile, the FR brake hydraulic pressure adjustment section 22 and the FL brake adjustment section 23 maintain the pressure-increasing valve PUfr and the pressure-reducing valve PDfr, and the pressure-increasing valve PUfl and the pressure-reducing valve PDfl in their unexcited states (their first positions) (or switch these valves into their first positions). With this operation, the brake fluid at the upstream sides of the FR brake hydraulic pressure adjustment section 22 and the FL brake adjustment section 23 is supplied to the wheel cylinder Wfr and the wheel cylinder Wfl, whereby the brake hydraulic pressures within the wheel cylinder Wfr and the wheel cylinder Wfl are increased. Accordingly, the brake units 11, 12 apply braking forces to the left and right front wheels FW1, FW2.

Incidentally, as described above, the brake units 11, 12 provided for the left and right front wheels FW1, FW2 are disc brake units, which can efficiently release friction heats generated as a result of frictional engagements between the brake discs and the brake pads, and are therefore excellent in cooling. However, in the case where the demanded deceleration Gd is realized by use of only the brake units 11, 12, the load imposed on the brake units 11, 12 increases with the demanded deceleration Gd, and the brake units 11, 12 may surfer a fading phenomenon, even through the brake units 11, 12 are excellent in cooling. Moreover, when the magnitude of the demanded deceleration Gd is greater than the magnitude of the deceleration generated in the vehicle by means of the braking forces applied to the left and right front wheels FW1, FW2 by the brake units 11, 12, the brake units 13, 14 must be operated so as to apply braking forces to the left and right rear wheels RW1, RW2 as well.

Figure 9:
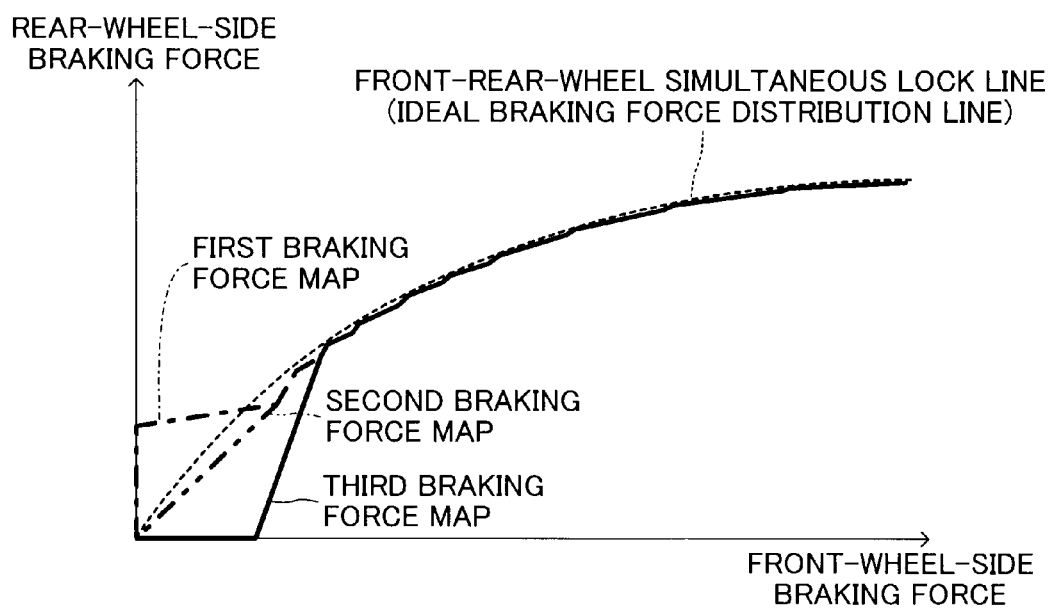
FIG. 9 is a graph for describing a third braking map representing the ratio between front-wheel-side braking force and rear-wheel-side braking force.

Therefore, in accordance with the third braking force map shown in FIG. 9, the electronic control unit 51 first operates the brake units 11, 12 until a predetermined braking force (corresponding to a predetermined deceleration) is attained whereby braking forces are applied only to the left and right front wheels FW1, FW2. After that, the electronic control unit 51 operates the brake units 13, 14 for the left and right rear wheels RW1, RW2 through EBD control. With this operation, the load of the brake units 11, 12 is reduced to thereby prevent occurrence of a fading phenomenon, whereby the vehicle can be braked properly.

Meanwhile, when the brake units 13, 14 are operated, friction heats are generated, and the internal space temperatures T increases. However, as is apparent from FIG. 9, the proportion (the inclination of a line representing the map) of the braking forces of the brake units 13, 14 which increases in accordance with the third braking force map is smaller than the proportion of the braking forces of the brake units 13, 14 which increases in accordance with the first braking force map. Therefore, the internal space temperatures T do not increase sharply, and can be maintained within the optimum temperature range.

Notably, in this case, in the brake hydraulic pressure control section 20, the RL brake hydraulic pressure adjustment section 24 and the RR brake hydraulic pressure adjustment section 25 switch the pressure-increasing valve PUrl and the pressure-reducing valve PDrl, and the pressure-increasing valve PUrr and the pressure-reducing valve PDrr to their unexcited states (their first positions). As a result, the brake fluid at the upstream sides of the RL brake hydraulic pressure adjustment section 24 and the RR brake hydraulic pressure adjustment section 25 is supplied to the wheel cylinder Wrl and the wheel cylinder Wrr, whereby the brake hydraulic pressures within the wheel cylinder Ml and the wheel cylinder Wrr are increased. Accordingly, the brake units 13, 14 apply braking forces to the left and right front wheels FW1, FW2.

Meanwhile, when the electronic control unit 51 determines in step S20 that each of the detected temperatures T is equal to or lower than the predetermined temperature Tu, the electronic control unit 51 makes a "No" determination. The electronic control unit 51 then executes the processing of step S13 and subsequent steps as in the case of the above-described first embodiment.

As can be understood from the above description, according to the second embodiment, the following effects can be attained in addition to the effects attained in the above-described first embodiment. That is, the electronic control unit 51 can operate the brake units 11, 12 preferentially when the detected internal space temperatures T of the brake units 13, 14 are higher than the predetermined temperature Tu, which is determined on the basis of the dimensionless performance index and which serves as the upper limit temperature. With this operation, the brake units 11, 12, which are excellent in cooling, apply braking forces to the left and right front wheels FW1, FW2, whereby the vehicle can be decelerated without making vehicle behavior unstable. In addition, excessive thermal energy generated as a result of braking can be efficiently discarded. Meanwhile, in the brake units 13, 14, which are excellent in thermal retaining, the internal space temperatures T are maintained within the optimum temperature range. Therefore, the thermoelectric conversion section 31 can generate regenerative electric power continuously and more efficiently.

Accordingly, the braking apparatus 10 according to the second embodiment can also satisfy a conflicting requirement of improving the conversion efficiency of the thermoelectric conversion section 31 without decreasing the braking forces produced by the brake units 11, 12, 13, 14.

c. Modifications of the First and Second Embodiments c-1. First Modification of the First and Second Embodiments

In the above-described first and second embodiments, the present invention is applied to the case where the brake units 13, 14 provided for the left and right rear wheels RW1, RW2 are drum brake units, and is embodied such that the braking force distribution; i.e., the proportion of the braking forces applied by the brake units 11, 12 and the proportion of the braking forces applied by the brake units 13, 14, are changed such that the internal space temperatures T of the brake units 13, 14 fall within the optimum temperature range in which the conversion efficiency of the thermoelectric conversion section 31 becomes good.

However, the present invention may be applied to the case where the brake units 13, 14 provided for the left and right rear wheels RW1, RW2 are so-called drum-in disc brake units. In the below description, this first modification will be described. Notably, for the description of this first modification, the same portions as those of the first and second embodiments are denoted by the same reference numerals, and their detailed descriptions are omitted.

Figure 10:
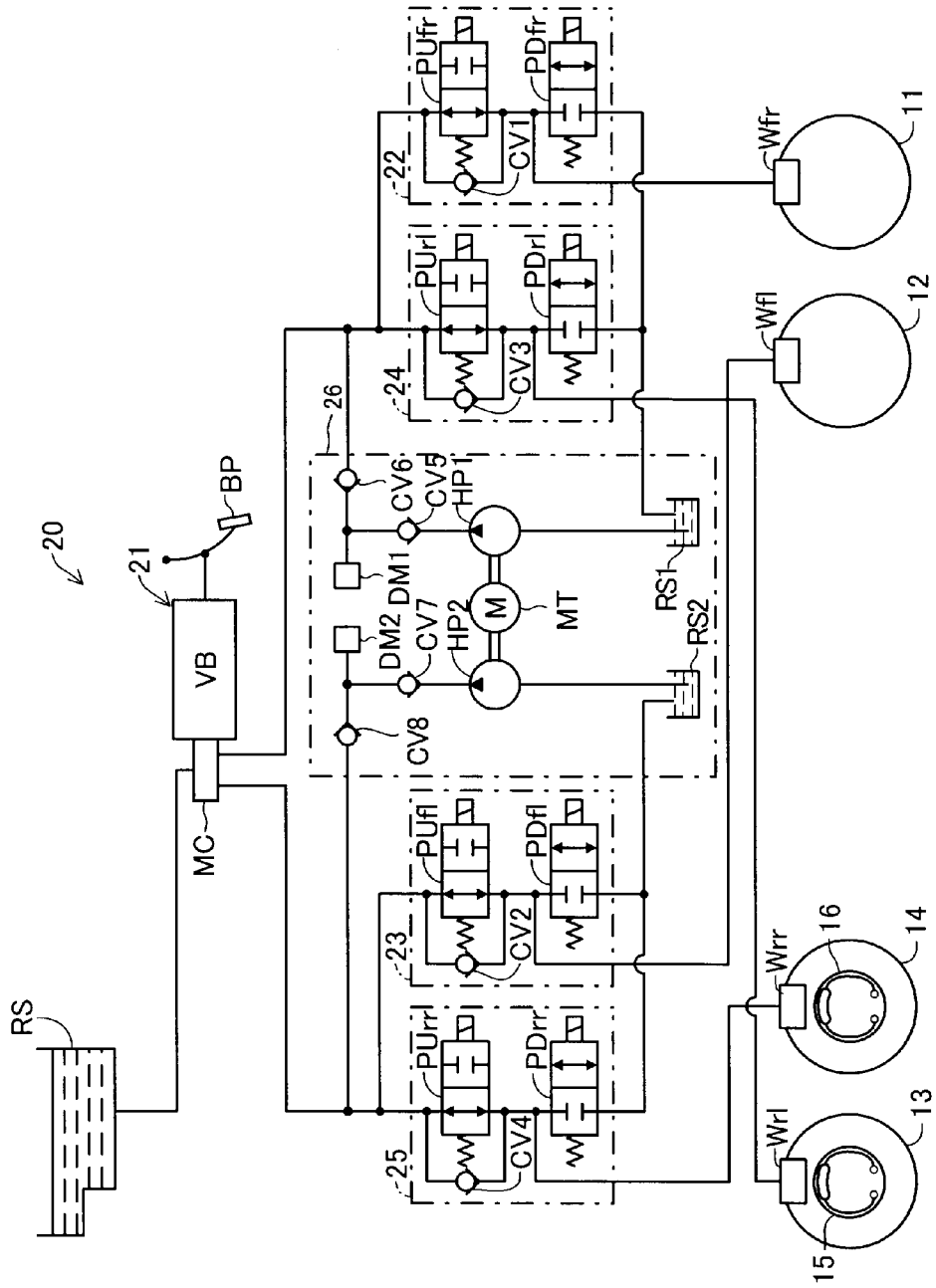
FIG. 10 is a schematic diagram relating to a modification of the first and second embodiments of the present invention and showing the configuration of a brake hydraulic pressure control section and rear-wheel-side brake units.

In this first modification, as schematically shown in FIG. 10, the brake units 13, 14 provided for the left and right rear wheels RW1, RW2 are replaced with disc brake units, and drum brake units 15, 16 are incorporated into these disc brake units. That is, in this first modification, drum-in disc brake units are provided for the left and right rear wheels RW1, RW2. Each of the drum-in disc brake units includes both a disc brake unit which is excellent in cooling and a drum brake unit which is excellent in heat retention. Since the structure and action of the drum-in disc brake units are well known, their detailed descriptions are omitted.

Each of the drum brake units 15, 16 includes a brake drum which rotates together with the brake disc of the brake unit 13 or 14, and a back plate fixed to, for example, a rear axle. Furthermore, each of the drum brake units 15, 16 includes an unillustrated actuator, such as a solenoid or an electric motor, which is electromagnetically operated and controlled by the electronic control unit 51 of the electric control apparatus 50 via the drive circuit 52. This actuator is assembled to the back plate of each of the drum brake units 15, 16. By the drive force of the actuator, brake shoes are pressed against the inner circumferential surface of a corresponding brake drum. Notably, the drum brake units 15, 16 may be used as drum brake units of a conventionally proposed automatic packing brake apparatus.

In this first modification, as in the case of the above-described first and second embodiments, the temperature sensors 42, 43 are attached to the back plates of the drum brake units 15, 16, and the thermoelectric conversion section 31 of the electric power collection section 30 is attached to each of the back plates. In this case, the temperatures T detected by the temperature sensors 42, 43 are the temperatures of internal spaces formed by the brake drums and the back plates of the drum brake units 15, 16, and the heating side of the thermoelectric conversion section 31 is located in the internal space. Accordingly, in this first modification, the drum brake units 15, 16 serve as the first braking force application means of the present invention, and the brake units 11, 12, 13, 14 serve as the second braking force application means of the present invention.

In this first modification as well, the electronic control unit 51 executes the braking-force-distribution changing program as in the case of the above-described first and second embodiments. However, the first modification slightly differs from these embodiments in the processing of steps S14 and S15 in the braking-force-distribution changing program shown in FIG. 5. Notably, in this first modification, as will be described later, the above-described steps S20 and step S21 of the braking-force-distribution changing program of the second embodiment having been described with reference to FIG. 8 can be omitted.

Specifically, in step S14 in this first modification, which is performed when the electronic control unit 51 determines in the above-described step S13 that the internal space temperatures T are equal to or lower than the predetermined temperature Ts, the electronic control unit 51 operates the drum brake units 15, 16 preferentially in accordance with the first braking force map shown in FIG. 6. Specifically, in order to increase the internal space temperatures T of the drum brake units 15, 16, the electronic control unit 51 operates only the drum brake units 15, 16 in accordance with the first braking force map to thereby apply braking forces to the left and right rear wheels RW1, RW2. That is, in this case, the proportion of the braking forces of the brake units 11, 12, 13, 14 is rendered zero.

In this case, the electronic control unit 51 supplies a predetermined drive current to the actuator of each drum brake unit 15, 16 via the drive circuit 52. As a result, the actuator transmits a drive force to the brake shoes, whereby the brake shoes are pressed against the inner circumferential surface of the brake drum, and friction heat is generated due to frictional engagement therebetween. Accordingly, the internal space temperature T exceeds the predetermined temperature Ts, and the heating side of the thermoelectric conversion section 31 is heated to the optimum temperature range. Therefore, the electric power collection section 30 (more specifically, the thermoelectric conversion section 31) can generate regenerative electric power at a satisfactory conversion efficiency, and can store the electric power.

Further, in step S15 in this first modification, which is performed when the electronic control unit 51 determines in the above-described step S13 that the internal space temperatures T are higher than the predetermined temperature Ts, the electronic control unit 51 applies braking forces to the left and right front wheels FW1, FW2 and the left and right rear wheels RW1, RW2 in accordance with the second braking force map shown in FIG. 7. Specifically, in accordance with the second braking force map, the electronic control unit 51 operates the brake units 11, 12 (disc brake units) for the left and right front wheels FW1, FW2, and operates the brake units 13, 14 (disc brake units) for the left and right rear wheels RW1, RW2.

In this case, when the electronic control unit 51 determines braking forces to be applied to the left and right rear wheels RW1, RW2 in accordance with the second braking force map, the electronic control unit 51 determines, in a coordinated manner, the braking forces of the brake units 13, 14 and the braking forces of the drum brake units 15, 16 in accordance with, for example, the internal space temperatures T of the drum brake units 15, 16 detected by the temperature sensors 42, 43.

More specifically, for example, in a situation where the internal space temperatures T of the drum brake units 15, 16 approach the upper limit temperature of the optimum temperature range (temperature Tu shown in FIG. 4), the electronic control unit 51 decreases (to zero) the braking forces of the drum brake units 15, 16 in order to restrain the generation of friction heat, and increases the braking forces of the brake units 13, 14 for coordination. Furthermore, for example, in a situation where the internal space temperatures T of the drum brake units 15, 16 are close to the lower limit temperature of the optimum temperature range (that is, the predetermined temperature Ts), the electronic control unit 51 increases the braking forces of the drum brake units 15, 16 in order to generate friction heat more, and decreases the braking forces of the brake units 13, 14 for coordination. As described above, by means of controlling the braking forces of the brake units 13, 14 and the braking forces of the drum brake units 15, 16 in a coordinated manner, the internal space temperatures T of the drum brake units 15, 16 can be maintained in the optimum temperature range.

Accordingly, in this first modification as well, the effects similar to those attained in the above-described first and second embodiments are expected. Furthermore, in this first modification, since the thermoelectric conversion section 31 is provided in each of the brake units 15, 16 to thereby generate regenerative electric power, it is unnecessary to heat the brake units 11, 12, 13, 14 (disc brake units) and maintain them in a heated state. That is, since the brake units 11, 12, 13, 14 (disc brake units) can apply braking forces to the left and right front wheels FW1, FW2 and the left and right rear wheels RW1, RW2 while securing an excellent cooling performance, the vehicle can be decelerated in a state in which vehicle behavior is stabilized considerably.

Moreover, the brake units 15, 16 include brake drums which rotate together with the brake discs of the brake units 13, 14. Therefore, the thermoelectric conversion sections 31 provided in the brake units 15, 16 collect thermal energy within the internal spaces and convert it to electric energy. Thus, the thermoelectric conversion sections 31 can cool the brake discs of the brake units 13, 14 via the brake drums. Since this configuration allows a reduction of the heat capacities of the brake units 13, 14, for example, the size of the brake units 13, 14 can be reduced.

As described above, in a situation where the internal space temperatures T of the drum brake units 15, 16 approach the upper limit temperature of the optimum temperature range; i.e., the predetermined temperature Tu described in the second embodiment, the electronic control unit 51 can decrease the braking forces of the drum brake units 15, 16 (or stop the operations of the drum brake units 15, 16 so as to make the proportion of the braking forces zero). Therefore, for example, when the detected internal space temperatures T of the drum brake units 15, 16 become higher than the predetermined temperature Tu, the electronic control unit 51 can stop the operations of the drum brake units 15, 16, and apply the braking forces of the brake units 13, 14 to the left and right rear wheels RW1, RW2.

As described above, in this first modification, since the braking forces of the brake units 13, 14 and the braking forces of the drum brake units 15, 16 can be controlled in a coordinated manner, the above-described steps S20 and S21 of the braking-force-distribution changing program in the second embodiment can be omitted. That is, in the second embodiment, when the electronic control unit 51 determines in the above-mentioned step S20 that the internal space temperatures T become higher than the predetermined temperature Tu, in step S21, the electronic control unit 51 determines the braking force distribution in accordance with the third braking force map such that the proportion of the braking forces of the brake units 13, 14 (drum brake units) whose internal space temperatures T have increased is set to zero, and only the braking forces of the brake units 11, 12 (disc brake units) are applied. With this operation, the internal space temperatures T of the brake units 13, 14 can be maintained in the optimum temperature range.

In contrast, in this first modification, when the internal space temperatures T of the drum brake units 15, 16 become higher than the predetermined temperature Tu, the operations of the drum brake units 15, 16 can be stopped, and the braking forces of the brake units 13, 14 can be increased. With this operation, the internal space temperatures T of the brake units 15, 16 can be maintained in the optimum temperature range. This operation corresponds to changing the braking force distribution with reference to the third braking force map by the processing of the above-mentioned steps S20 and S21 of the braking-force-distribution changing program in the second embodiment. Therefore, in this first modification, the steps S20 and S21 described in the second embodiment can be omitted.

c-2. Second Modification of the First and Second Embodiments

In the above-described first and second embodiments, the present invention is applied to the case where the brake units 13, 14 provided for the left and right rear wheels RW1, RW2 are drum brake units, and is embodied such that the braking force distribution; i.e., the proportion of the braking forces applied by the brake units 11, 12 and the proportion of the braking forces applied by the brake units 13, 14, are changed such that the internal space temperatures T of the brake units 13, 14 fall within the optimum temperature range in which the conversion efficiency of the thermoelectric conversion section 31 becomes good.

However, the present invention may be applied to the case where the brake units 13, 14 are disc brake units each including two calipers for a single brake disc, although the disc brake units are slightly inferior to the drum brake units in terms of the performance of maintaining the internal space temperature T within the optimum temperature range; i.e., retaining friction heat generated through frictional engagement. In the below description, this second modification will be described. Notably, for the description of this second modification as well, the same portions as those of the first and second embodiments are denoted by the same reference numerals, and their detailed descriptions are omitted.

Figure 11:
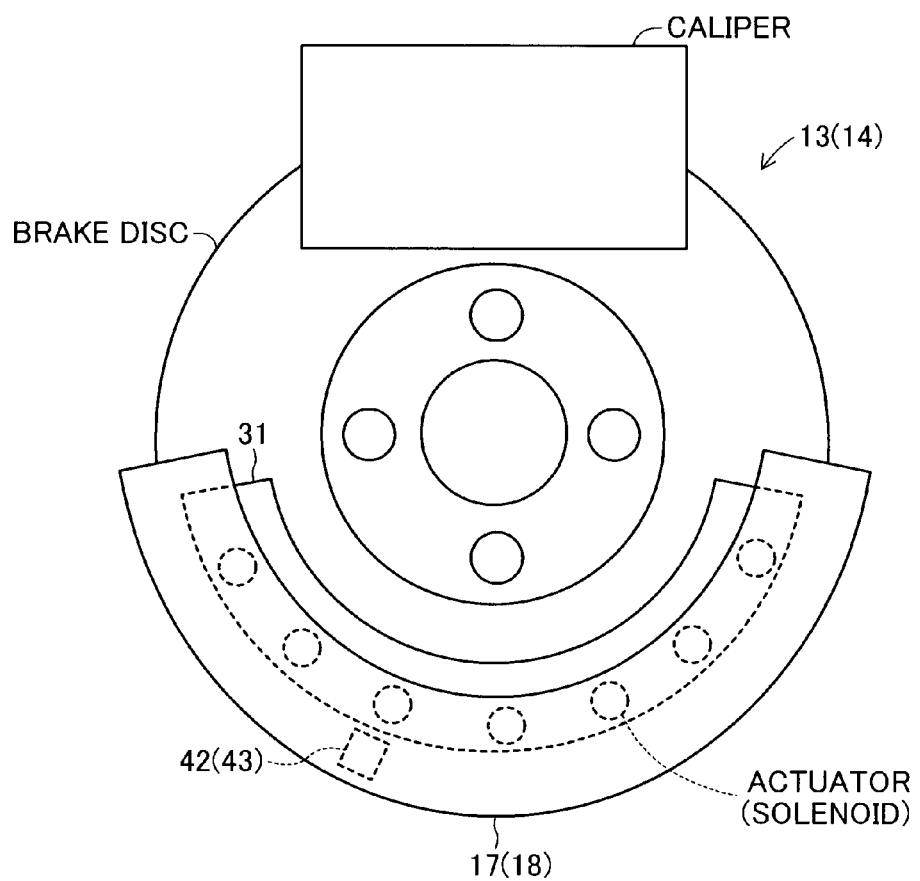
FIG. 11 is a schematic view showing a rear-wheel-side brake unit according to the modification of the first and second embodiments of the present invention.

In this second modification, as schematically shown in FIG. 11, one of the two calipers of each brake unit 13, 14 has a brake pad as in the case of an ordinary disc brake unit. Further, disc brake units 17, 18 are provided in the brake units 13, 14. In each of the disc brake units 17, 18, the other caliper has the thermoelectric conversion section 31 in stead of the brake pad, and the temperature sensor 42, 43.

As shown in FIG. 11, the thermoelectric conversion section 31 used in this second modification is formed into a plate-like shape; and one surface which comes into contact with the brake disc as will be described later (a surface facing the brake disc) severs as a heating side, and the other surface (a surface always exposed to the outside air) serves as a cooling side. Moreover, each of the temperature sensors 42, 43 used in this second modification detects the temperature T of the corresponding brake disc, and outputs a signal representing the detected temperature T to the electric control apparatus 50 (more specifically, the electronic control unit 51).

Although not illustrated in FIG. 11 in detail, each of the disc brake units 17, 18 includes a plurality of actuators (e.g., solenoids) which are electromagnetically operated and controlled by the electronic control unit 51 of the electric control apparatus 50 via the drive circuit 52. The actuators bring the thermoelectric conversion section 31 into contact with the brake disc and separate the thermoelectric conversion section 31 from the brake disc. When the actuators generate a drive force, the thermoelectric conversion section 31 is pressed against the brake disc. With this operation, the disc brake units 17, 18 apply braking forces to the left and right rear wheels RW1, RW2 through frictional engagement between the thermoelectric conversion section 31 and the brake disc. Notably, in this case, instead of the actuators, for example, a bimetal which bends in one direction due to a difference in expansion coefficient when a temperature difference arises in the bimetal may be used so as to bring the thermoelectric conversion section 31 into contact with the brake disc and separate it from the brake disc. Accordingly, in this second modification, the disc brake units 17, 18 sever as the first braking force application means of the present invention, and the brake units 11, 12, 13, 14 serve as the second braking force application means of the present invention.

In this second modification as well, the electronic control unit 51 executes the braking-force-distribution changing program as in the case of the above-described first and second embodiments. However, the second modification slightly differs from these embodiments in the processing of steps S13, S14 and S15 in the braking-force-distribution changing program shown in FIG. 5. Notably, in this second modification as well, as will be described later, the above-described steps S20 and step S21 of the braking-force-distribution changing program of the second embodiment having been described with reference to FIG. 8 can be omitted.

Specifically, in this second modification, the temperature sensors 42, 43 detect the temperatures T of the corresponding brake discs. Therefore, in step S13 in the second modification, the electronic control unit 51 determines whether or not the temperatures T of the brake discs detected by the temperature sensors 42, 43 are equal to or lower than the predetermined temperature Ts.

When the temperatures T of the brake discs are equal to or lower than the predetermined temperature Ts, set as the lower limit temperature of the optimum temperature range, in step S14, the electronic control unit 51 operates the disc brake units 17, 18 preferentially in accordance with the first braking force map shown in FIG. 6. Specifically, in order to increase the temperatures T of the brake discs, the electronic control unit 51 operates only the disc brake units 17, 18 in accordance with the first braking force map to thereby apply braking forces to the left and right rear wheels RW1, RW2. That is, in this case, the proportion of the braking forces of the brake units 11, 12, 13, 14 is rendered zero.

In this case, the electronic control unit 51 supplies predetermined drive currents to the actuators of each disc brake unit 17, 18 via the drive circuit 52. As a result, the actuators transmit a drive force to the thermoelectric conversion section 31, whereby the thermoelectric conversion section 31 is pressed against the brake disc, and friction heat is generated due to frictional engagement therebetween. Accordingly, the temperature T of the brake disc exceeds the predetermined temperature Ts, and the heating side of the thermoelectric conversion section 31 is heated to the optimum temperature range. Further, the cooling side of the thermoelectric conversion section 31 is cooled by the outside air. Therefore, the electric power collection section 30 (more specifically, the thermoelectric conversion section 31) can generate regenerative electric power, and can store the electric power.

Further, in step S15 in this second modification, which is performed when the electronic control unit 51 determines in the above-described step S13 that the internal space temperatures T are higher than the predetermined temperature Ts, the electronic control unit 51 applies braking forces to the left and right front wheels FW1, FW2 and the left and right rear wheels RW1, RW2 in accordance with the second braking force map shown in FIG. 7. Specifically, in accordance with the second braking force map, the electronic control unit 51 operates the brake units 11, 12 (disc brake units) for the left and right front wheels FW1, FW2, and operates the brake units 13, 14 (disc brake units) for the left and right rear wheels RW1, RW2.

In this case, when the electronic control unit 51 determines braking forces to be applied to the left and right rear wheels RW1, RW2 in accordance with the second braking force map, the electronic control unit 51 determines, in a coordinated manner, the braking forces of the brake units 13, 14 and the braking forces of the disc brake units 17, 18 in accordance with, for example, the temperatures T of the brake discs detected by the temperature sensors 42, 43.

More specifically, for example, in a situation where the temperatures T of the brake discs approach the upper limit temperature of the optimum temperature range (temperature Tu shown in FIG. 4), the electronic control unit 51 decreases (to zero) the braking forces of the disc brake units 17, 18 in order to separate the thermoelectric conversion sections 31 from the brake discs, and increases the braking forces of the brake units 13, 14 for coordination. Furthermore, for example, in a situation where the temperatures T of the brake discs are close to the lower limit temperature of the optimum temperature range (that is, the predetermined temperature Ts), the electronic control unit 51 increases the braking forces of the disc brake units 17, 18 in order to further heat the heating sides of the thermoelectric conversion sections 31, and decreases (or maintains) the braking forces of the brake units 13, 14 for coordination. As described above, by means of controlling the braking forces of the brake units 13, 14 and the braking forces of the disc brake units 17, 18 in a coordinated manner, the heating sides of the thermoelectric conversion sections 31 can be heated and maintained in the optimum temperature range.

As described above, in a situation where the temperatures T of the brake discs approach the upper limit temperature of the optimum temperature range; i.e., the predetermined temperature Tu described in the second embodiment, the electronic control unit 51 can decrease the braking forces of the disc brake units 17, 18 (or stops the operations of the disc brake units 17, 18 so as to make the proportion of the braking forces zero). Therefore, for example, when the detected temperatures T of the brake discs become higher than the predetermined temperature Tu, the electronic control unit 51 can stop the operations of the disc brake units 17, 18 (that is, separate the thermoelectric conversion sections 31 from the brake discs), and apply the braking forces of the brake units 13, 14 to the left and right rear wheels RW1, RW2.

As described above, in this second modification as well, since the braking forces of the brake units 13, 14 and the braking forces of the disc brake units 17, 18 can be controlled in a coordinated manner, for the same reason mentioned in the above-described first modification, the above-described steps S20 and S21 of the braking-force-distribution changing program in the second embodiment can be omitted.

Accordingly, in this second modification as well, the effects similar to those attained in the above-described first and second embodiments, and the above-described first modification are expected.

In the above-described second modification, the present invention is embodied such that the disc brake units 17, 18 are operated preferentially in accordance with the first braking force map so as to actively apply braking forces to the left and right rear wheels RW1, RW2. However, the present invention may be embodied such that the brake units 13, 14 are operated preferentially to thereby apply braking forces to the left and right rear wheels RW1, RW2, and, when the vehicle stops, the disc brake units 17, 18 are operated.

That is, in this case, when a driver operates the brake pedal BP, the electronic control unit 51 operates the brake units 11, 12 and operates the brake units 13, 14 in accordance with the above-described second map to thereby generate braking forces through frictional engagement between the brake discs and the brake pads. As a result, the temperatures of the brake discs increase due to friction heat. Subsequently, the electronic control unit 51 determines whether or not the vehicle is in a stopped state on the basis of the vehicle speed V detected by the vehicle speed sensor 45.

When the vehicle is in a stopped state, the electronic control unit 51 operates the disc brake units 17, 18 so as to bring the thermoelectric conversion sections 31 into contact with the brake discs each having an increased temperature T. As a result, the heating sides of the thermoelectric conversion sections 31 are heated, whereby the thermoelectric conversion sections 31 can generate and store regenerative electric power.

By means of operating the disc brake units 17, 18 when the vehicle is stopped, the loads acting on the thermoelectric conversion sections 31 can be reduced greatly. Thus, breakage of the thermoelectric conversion sections 31 can be prevented, even though the mechanical strength of the thermoelectric conversion sections 31 is low. Furthermore, by means of operating the disc brake units 17, 18 when the vehicle is stopped, the disc brake units 17, 18 can be utilized as a so-called automatic parking brake apparatus.

In the above-described second modification, the present invention is applied to the case where the brake units 13, 14 provided for the left and right rear wheels RW1, RW2 include the disc brake units 17, 18. In this case, no particular limitation is imposed on the layout of the disc brake units 17, 18, and, needless to say, the brake units 11, 12 provided for the left and right front wheels FW1, FW2 may include the disc brake units 17, 18.

In the above-described second modification, the present invention is applied to the case where the disc brake units 17, 18 are provided in the brake units 13, 14 one for each brake unit 13, 14. In this case, a plurality of disc brake units (more specifically, calipers) including thermoelectric conversion sections having different temperature characteristics may be provided in the brake units 13, 14. This configuration allows the following operation. In a situation where the temperature T of each brake disc changes as a result of braking of the vehicle, the disc brake units (more specifically, calipers) including thermoelectric conversion sections having different temperature characteristics suitable for different ranges of the detected temperature T are operated sequentially, whereby regenerative electric power can be generated more efficiently.

In the above-described embodiments and modifications, the temperature sensors 42, 43 are provided in the brake units 13, 14, 15, 16, 17, 18 in order to directly detect the internal space temperatures T of the brake units 13 to 16, and the temperatures T of the brake discs of the brake units 17, 18. However, the present invention may be embodied such that the amount of friction heat generated through frictional engagement between a brake drum and brake shoes or between a brake disc and brake pads is calculated by using the heat loss coefficient, specific heat, weight, mechanical equivalent, etc. of the brake drum or the brake disc as a physical quantity experimentally set in advance and using the deceleration G detected by the longitudinal acceleration sensor 41, and the temperature T is estimated from the amount of friction heat. In this case, the temperature sensors 42, 43 can be omitted, and the transmitter and the receiver can be omitted. Therefore, cost can be lowered.

In the above-described embodiments and modifications, the braking force distribution is changed such that the internal space temperatures T of the brake units 13, 14, 15, 16 or the temperatures T of the brake discs of the brake units 17, 18 fall within the optimum temperature range in which the conversion efficiency of the thermoelectric conversion section 31 becomes satisfactory. That is, in the above-described embodiments and modifications, the electronic control unit 51 changes the braking force distribution on the basis of results of comparison between the detected temperatures T and the predetermined temperature Ts (lower limit temperature) or the predetermined temperature Tu (upper limit temperature) which determines the optimum temperature range in which the conversion efficiency of the thermoelectric conversion section 31 becomes satisfactory.

The present invention may be practiced such that the braking force distribution is changed on the basis of results of comparison between the detected temperatures T and a temperature(s) which determines, in place of or in addition to the optimum temperature range in which the conversion efficiency of the thermoelectric conversion section 31 becomes satisfactory, a temperature region in which the brake units 13 to 18 suffer a fading phenomenon. With this operation, braking force can be applied to the vehicle more properly, and the thermoelectric conversion sections 31 can collect thermal energy and generate regenerative electric power.

d. Third Embodiment

In the above-described embodiments and modifications, the present invention is embodied such that the brake units 11 to 18 provided for the left and right front wheels FW1, FW2 and the left and right rear wheels RW1, RW2 produce frictional braking forces; and the heating side of each thermoelectric conversion section 31 is heated, for example, within the optimum temperature range by using friction heat generated at the time of braking, so as to convert thermal energy to electric energy at a satisfactory conversion efficiency, to thereby generate regenerative electric power.

In this case, the brake units each including a thermoelectric conversion section 31 (first braking force application means) are not limited to those disposed near the wheels, and may be disposed at any location, so long as a brake unit(s) can apply braking forces to the wheels. In the below description, a third embodiment in which a brake unit including a thermoelectric conversion section 31 is provided in a transmission of a vehicle will be described in detail. Notably, for the description of this third embodiment as well, the same portions as those of the above-described embodiments and modifications thereof are denoted by the same reference numerals, and their detailed descriptions are omitted.

Figure 12:
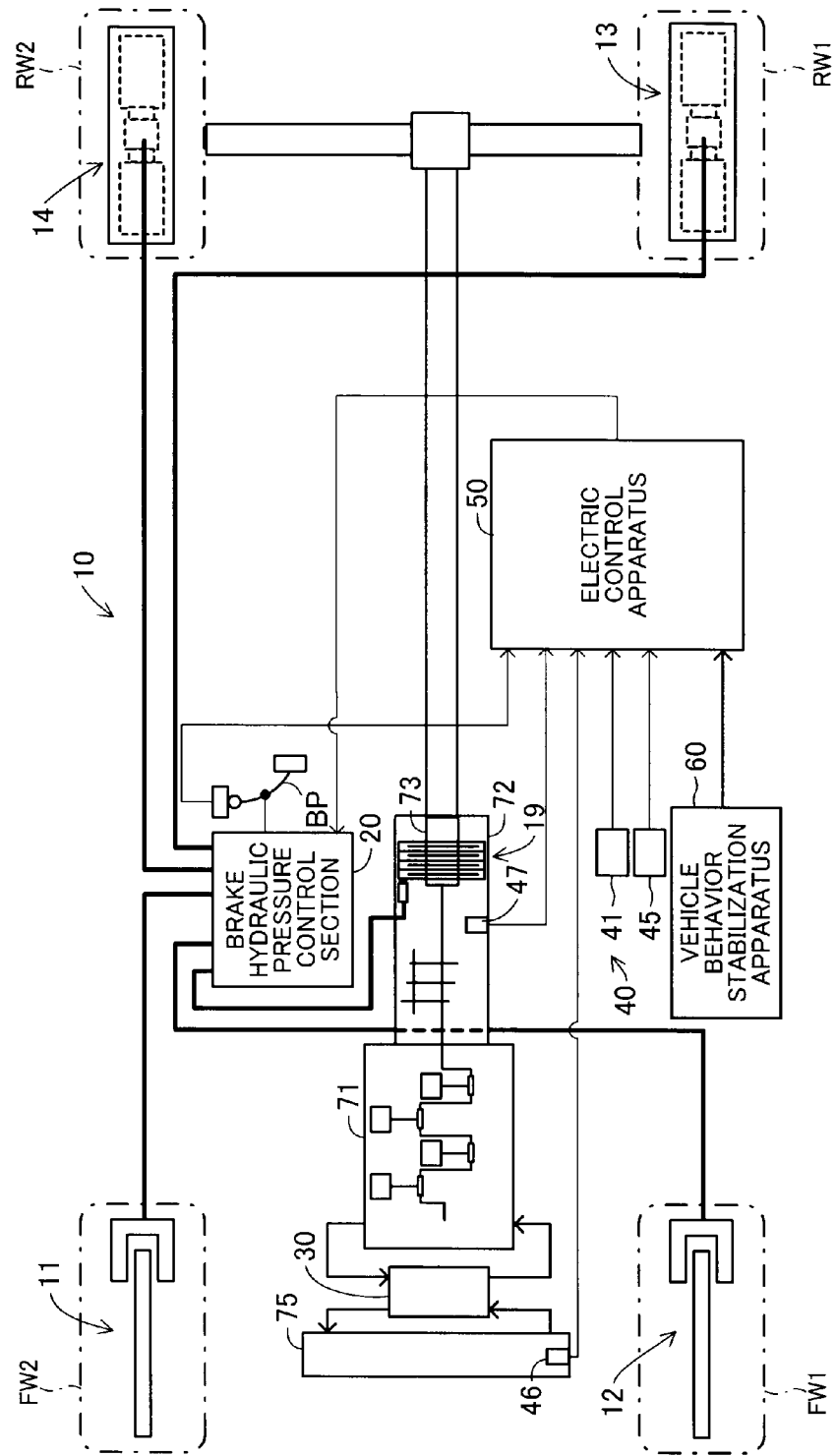
FIG. 12 is a schematic diagram showing the configuration of a vehicular braking apparatus according to a third embodiment of the present invention.

In this third embodiment, the present invention is embodied such that a brake unit is provided on an output shaft which transmits drive force from the transmission of the vehicle to drive wheels (in the present embodiment, the left and right rear wheels RW1, RW2 are drive wheels). Notably, as shown in FIG. 12, in this third embodiment, brake units 11, 12, 13, 14 similar to those employed in the first embodiment are provided for the left and right front wheels FW1, FW2 and the left and right rear wheels RW1, RW2. Notably, the present invention is not limited to the case where the brake units 13, 14 provided for the left and right rear wheels RW1, RW2 are drum brake units, and disc brake units may be employed for the brake units 13, 14.

In this third embodiment, as shown in FIG. 12, a brake unit 19 is provided in a transmission 72 connected to a crankshaft of an engine 71 mounted on the vehicle. The transmission 72 transmits rotation of an input shaft connected to the crankshaft of the engine 71 to an output shaft 73 while changing the gear ratio by changing the meshing engagement among various gears. Rotation of the output shaft 73 is transmitted to the left and right rear wheels RW1, RW2 via a propeller shaft, a differential, and axles.

The brake unit 19 is provided in lubrication oil which fills the interior of the casing of the transmission 72. The brake unit 19 is operated by a cylinder Wh to which brake fluid is supplied from the brake hydraulic pressure control section 20, and applies frictional braking force against rotation of the output shaft 73. The brake unit 19 may be a multiplate wet brake which applies braking force to the output shaft 73 by means of frictional engagements between plates. In this case, as specifically shown in FIG. 13, the brake unit 19 is operated by brake hydraulic pressure supplied from a TM brake hydraulic pressure adjustment section 27 of the brake hydraulic pressure control section 20. When the brake hydraulic pressure supplied from the TM brake hydraulic pressure adjustment section 27 increases, the cylinder Wh operates to increase the friction between the plates, to thereby increase the braking force applied to the output shaft 73. Furthermore, when the supplied brake hydraulic pressure decreases, the cylinder Wh of the brake unit 19 operates to decrease the friction between the plates, to thereby decrease the braking force applied to the output shaft 73.

Notably, the TM brake hydraulic pressure adjustment section 27 is configured in the same manner as in the case of the above-described FR brake hydraulic pressure adjustment section 22; i.e., includes a pressure-increasing valve PUh and a pressure-reducing valve PDh. By means of controlling the pressure-increasing valve PUh and the pressure-reducing valve PDh in the same manner as in the case of the above-described FR brake hydraulic pressure adjustment section 22, the brake hydraulic pressure within the cylinder Wh is increased, maintained, or decreased. Furthermore, a check valve CV9 having the same function as the above-described check valve CV1 is connected in parallel to the pressure-increasing valve PUh.

Figure 14:
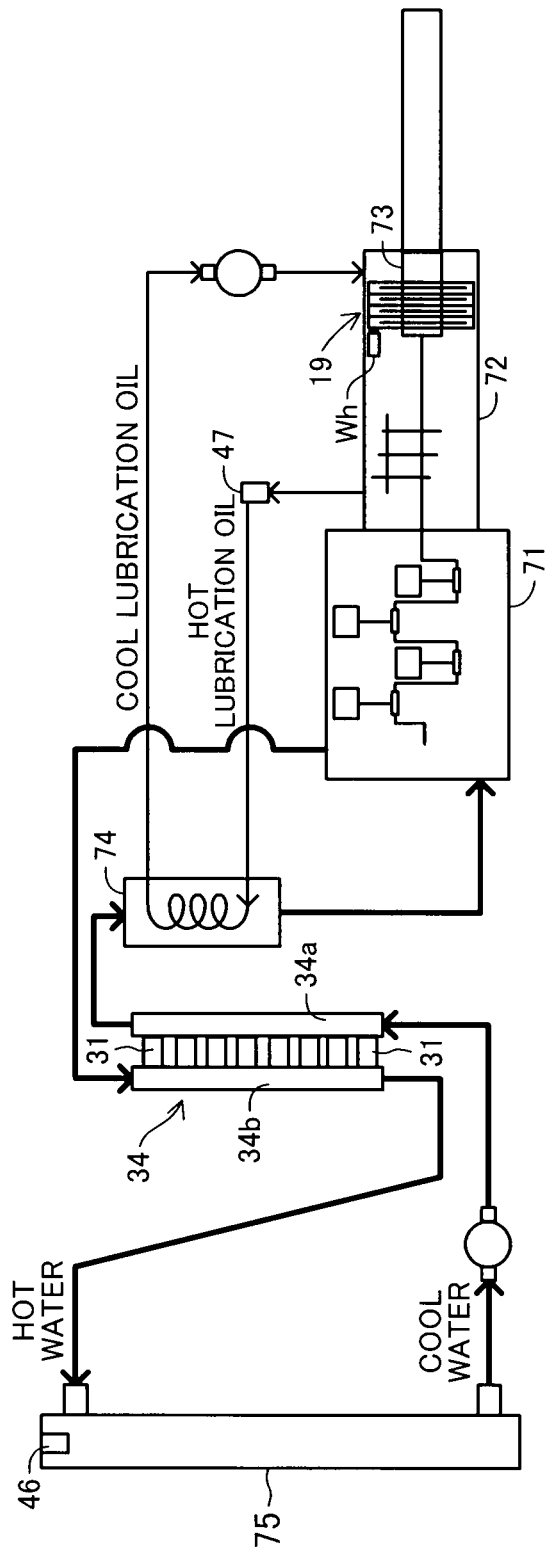
FIG. 14 is a schematic diagram relating to the third embodiment of the present invention and used for describing collection of thermal energy by an electric power collection section of FIG. 12.

Furthermore, as shown in FIG. 14, lubrication oil is circulated through the transmission 72 via a heat exchanger 74. The heat exchanger 74 perform heat exchange between the lubrication oil (hereinafter referred to as "hot lubrication oil") which has an increased temperature mainly because of operation of the brake unit 19 and cooling water (cool water) supplied from a radiator 75 so as to maintain a proper operation temperature of the engine 71. The hot lubrication oil is cooled by the heat exchanger 74 through heat exchange, and the cooled lubrication oil (hereinafter referred to as "cool lubrication oil") is returned to the transmission 72 via a pump. Furthermore, the cooling water supplied from the radiator 75 is warmed by the heat exchanger 74 through heat exchange, and the warmed cooling water is fed to the engine 71 by a pump.

In this third embodiment, an electric power collection section 30 includes a thermoelectric conversion unit 34. As shown in FIG. 14, the thermoelectric conversion unit 34 includes a plurality of (eight in the drawing) thermoelectric conversion sections 31 disposed in parallel. In the thermoelectric conversion unit 34, the cooling side of each thermoelectric conversion section 31 is connected to a cooling pipe 34*a*, through which cooling water (cool water) supplied directly from the radiator 75 flows; and the heating side of each thermoelectric conversion section 31 is connected to a heating pipe 34*b*, through which cooling water (hot water) returned from the engine 71 to the radiator 75 flows. Notably, although not illustrated in FIG. 14, each thermoelectric conversion section 31 is connected to the battery 33 via the voltage transformation circuit 32, as in the case of the first and second embodiments.

In the thermoelectric conversion unit 34 configured as described above, the cooling water (cool water) cooled by the radiator 75 flows through the cooling pipe 34*a*, and the cooling water (hot water) heated by operation of the engine 71 and operations of the transmission 72 and the brake unit 19 flows through the heating pipe 34*b*, whereby the cooling side of each thermoelectric conversion section 31 is cooled, and the heating side thereof is heated. As a result, each thermoelectric conversion section 31 collects thermal energy from the temperature difference between the heating side and the cooling side, and converts it to electric energy.

Accordingly, the thermoelectric conversion unit 34 is adapted to collect at least friction heat (thermal energy) generated as a result of operation of the brake unit 19; that is, application of frictional braking force to the output shaft 73, and convert the collected friction heat (thermal energy) to regenerative electric power (electric energy). Therefore, in this third embodiment, the heat collection means of the present invention is constituted by the thermoelectric conversion unit 34 and the heat exchanger 74; and the brake unit 19, which is thermally connected to the thermoelectric conversion unit 34 and the heat exchanger 74 via lubrication oil and cooling water, serves as the first braking force application means of the present invention.

In this third embodiment, in place of or in addition to the temperature sensors 42, 43 used in the above-described embodiments and modifications, a water temperature sensor 46 and an oil temperature sensor 47 are provided as temperature detection means. The water temperature sensor 46 detects the temperature of cooling water (hot water) returned from the engine 71 to the radiator 75. The oil temperature sensor 47 detects the temperature of lubrication oil circulating through the transmission 72. As shown in FIG. 14, the water temperature sensor 46, which is attached to, for example, the radiator 75, detects the temperature Tw of the cooling water (hot water) returned from the engine 71, and outputs a signal representing the water temperature Tw to the electronic control unit 51 of the electric control apparatus 50. As shown in FIG. 14, the oil temperature sensor 47, which is provided in a flow path of hot lubrication oil flowing from the transmission 72 toward the heat exchanger 74, detects the temperature Ty of the hot lubrication oil, and outputs a signal representing the oil temperature Ty to the electronic control unit 51 of the electric control apparatus 50.

Next, operation of this third embodiment will be described. In this third embodiment, the electronic control unit 51 executes a braking-force-distribution changing program shown in FIG. 15. The program in this third embodiment differs from the braking-force-distribution changing program used in the first embodiment in that the above-described step S13 is changed to (is replaced with) step S30. Furthermore, in association with the replacement of step S13 with step S30, the processings of steps S14 and S15 are slightly modified from those of the above-described steps S14 and S15 of the braking-force-distribution changing program of the first embodiment. Therefore, in the following description, the same portions as those of the above-described first embodiment are denoted by the same reference numerals, and their detailed descriptions are omitted.

In this third embodiment as well, the electronic control unit 51 starts the execution of the braking-force-distribution changing program in step S10. The electronic control unit 51 then determines in step S11 whether or not the driver requests braking, and determines in step S12 whether or not the vehicle behavior stabilization apparatus 60 is in an unoperated state. Subsequently, the electronic control unit 51 proceeds to step S30.

In step S30, the electronic control unit 51 determines whether or not the temperature Tw of the cooling water (hot water) detected by the water temperature sensor 46 is equal to or lower than a predetermined temperature Twu previously set as an upper limit temperature, and the temperature Ty of the hot lubrication oil detected by the oil temperature sensor 47 is equal to or lower than a predetermined temperature Tyu previously set as an upper limit temperature. The predetermined temperature Twu for the cooling water (hot water) is determined to coincide with the upper limit temperature of a temperature region for operating the engine 71 properly. Similarly, the predetermined temperature Tyu for the hot lubrication oil is determined to coincide with the upper limit temperature of a temperature region for operating the transmission 72 properly. When the detected water temperature Tw is equal to or lower than the predetermined temperature Twu and the detected oil temperature Ty is equal to or lower than the predetermined temperature Tyu, the electronic control unit 51 makes a "Yes" determination, and proceeds to step S14.

In step S14 in the third embodiment, as in the above-described first embodiment, the electronic control unit 51 operates the brake unit 19 preferentially over the brake units 11, 12, 13, 14 with reference to the first braking force map shown in FIG. 6. That is, the electronic control unit 51 operates the brake hydraulic pressure control section 20 by supplying predetermined drive currents thereto via the drive circuit 52.

In the brake hydraulic pressure control section 20, by making use of the supplied predetermined drive currents, the FR brake hydraulic pressure adjustment section 22, the FL brake hydraulic pressure adjustment section 23, the RL brake hydraulic pressure adjustment section 24, and the RR brake adjustment section 25 switch the pressure-increasing valve PUfr and the pressure-reducing valve PDfr, the pressure-increasing valve PUfl and the pressure-reducing valve PDfl, the pressure-increasing valve PUrl and the pressure-reducing valve PDrl, and the pressure-increasing valve PUrr and the pressure-reducing valve PDrr to their excited states (their second positions). With this operation, the brake fluid within the wheel cylinder Wfr, the wheel cylinder Wfl, the wheel cylinder Wrl, and the wheel cylinder Wrr is returned to the reservoirs RS1 and RS2, whereby the brake hydraulic pressures within the wheel cylinder Wfr, the wheel cylinder Wfl, the wheel cylinder Wrl, and the wheel cylinder Wrr are decreased. Accordingly, the brake units 11, 12, 13, 14 do not apply braking forces to the left and right front wheels FW1, FW2 and the left and right rear wheels RW1, RW2.

Figure 13:
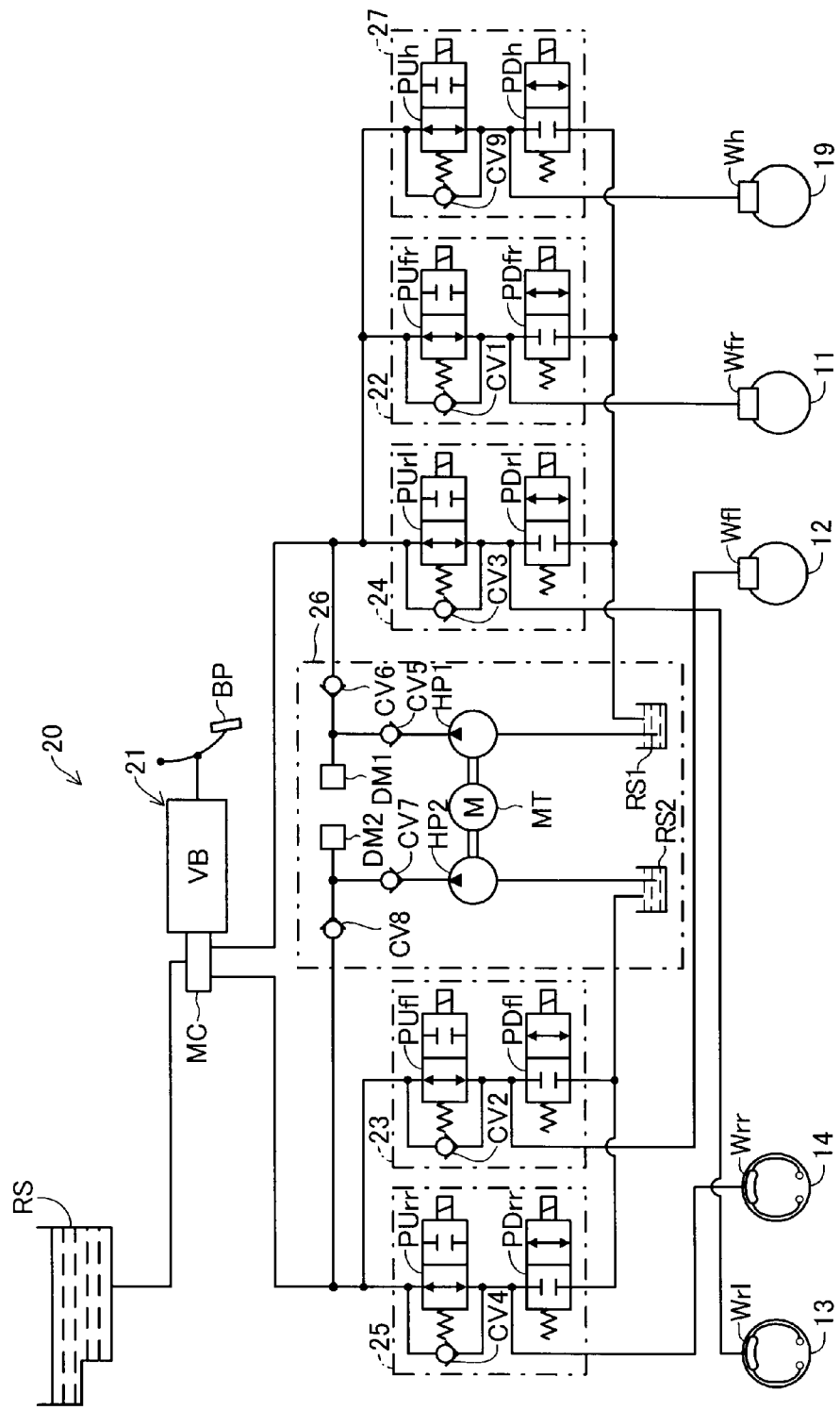
FIG. 13 is a schematic diagram showing the configuration of a brake hydraulic pressure control section of FIG. 12.

Meanwhile, the TM brake hydraulic pressure adjustment section 27 maintains the pressure-increasing valve PUh and the pressure-reducing valve PDh in their unexcited states (their first positions) shown in FIG. 13. As a result, the brake fluid at the upstream side of the TM brake hydraulic pressure adjustment section 27 is supplied to the cylinder Wh, whereby the brake hydraulic pressure within the cylinder Wh is increased. Therefore, the brake unit 19 applies braking force against rotation of the output shaft 73; that is, applies braking force to the left and right rear wheels RW1, RW2, which serve as drive wheels.

When the brake unit 19 applies braking force to the output shaft 73, friction heat is generated as a result of friction engagement between the plates of the multiplate wet brake, whereby the temperature Ty of the lubrication oil within the transmission 72 increases. This hot lubrication oil is fed to the heat exchanger 74 for heat exchange with the cooling water (cool water) supplied from the radiator 75, and is then returned to the transmission 72.

Meanwhile, the cooling water (cool water) warmed through heat exchange is supplied to the engine 71. The warmed cooling water (cool water) is circulated within the engine 71 so as to collect heat generated as a result of operation of the engine 71. As a result, the cooling water (cool water) warmed through heat exchange is heated further, and the cooling water (hot water) having an increased water temperature Tw is supplied to the thermoelectric conversion unit 34.

In thermoelectric conversion unit 34, the cooling side of each thermoelectric conversion section 31 is cooled by the cooling water (cool water) which is directly supplied from the radiator 75 and flows through the cooling pipe 34a, and the heating side thereof is heated by the cooling water (hot water) which is supplied from the engine 71 and flows through the heating pipe 34b. As a result, the electric power collection section 30 (more specifically, the thermoelectric conversion unit 34) can generate and store regenerative electric power. Furthermore, since the temperature difference between the cooling water (cool water) supplied directly from the radiator 75 and the cooling water (hot water) supplied from the engine 71 is maintained, the electric power collection section 30 (more specifically, each thermoelectric conversion section 31) can continuously generate and store regenerative electric power for a long period of time.

As in the case of the above-described first embodiment, when the magnitude of the demanded deceleration Gd is large and braking forces must be applied to the left and right front wheels FW1, FW2 as well, the electronic control unit 51 first operates the brake unit 19 only in accordance with the first braking force map shown in FIG. 6, until a predetermined braking force (corresponding to a predetermined deceleration) is attained, to thereby apply braking forces to the left and right rear wheels RW1, RW2. That is, in this case, the proportion of the braking forces of the brake units 11, 12, 13, 14 is rendered zero. After that, the electronic control unit 51 operates the brake units 11, 12 for the left and right front wheels FW1, FW2 by means of EBD control.

Notably, in this case, when the braking forces applied to the left and right rear wheels RW1, RW2 are increased in accordance with the first braking force map, the electronic control unit 51 operates the brake units 13, 14 while coordinating the brake units 13, 14 with the brake unit 19, whereby braking forces of a proper magnitude are applied to the left and right rear wheels RW1, RW2.

Incidentally, the heat exchanger 74 performs heat exchange between the cooling water (cool water) supplied from the radiator 75 and the hot lubrication oil having an increased oil temperature Ty as a result of operation of the brake unit 19. The cooling water (cool water) warmed through heat exchange is supplied to the engine 71. By virtue of this configuration, even in a situation where the temperature Tw of the cooling water becomes excessively low (for example, in a cold period or when the vehicle travels on a downhill), the temperature Tw of the cooling water can be maintained at a proper level by making use of friction heat generated as a result of application of braking force to the output shaft 73 by the brake unit 19. Accordingly, the engine 71 can be operated efficiently, and fuel saving can be achieved.

Figure 15:
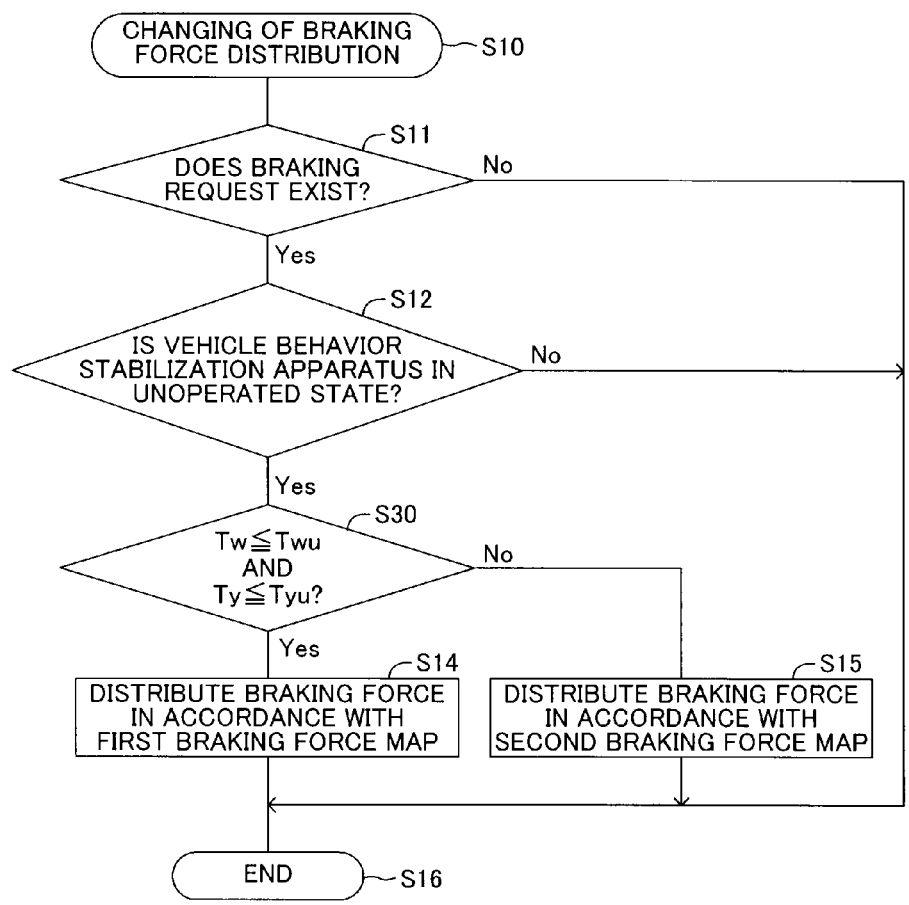
FIG. 15 is a flowchart relating to the third embodiment of the present invention and showing a braking-force-distribution changing program executed by an electronic control unit of FIG. 12.

Referring back to the flowchart of FIG. 15, when the electronic control unit 51 determines in step S30 that the detected water temperature Tw is higher than the predetermined temperature Twu or the detected oil temperature Ty is higher than the predetermined temperature Tyu, the electronic control unit 51 makes a "No" determination, and proceeds to step S15.

In step S15 in the third embodiment, the electronic control unit 51 stops the operation of the brake unit 19. That is, in this case, the proportion of the braking force of the brake unit 19 is rendered zero. Meanwhile, the electronic control unit 51 operates the brake units 11, 12, 13, 14 with reference to the second braking force map shown in FIG. 7, to thereby apply braking forces to the left and right front wheels FW1, FW2 and the left and right rear wheels RW1, RW2.

Specifically, the electronic control unit 51 operates the brake hydraulic pressure control section 20 by supplying predetermined drive currents thereto via the drive circuit 52. In the brake hydraulic pressure control section 20, by making use of the supplied predetermined drive currents, the TM brake hydraulic pressure control section 27 switches the pressure-increasing valve PUh and the pressure-reducing valve PDh to their excited states (their second positions). With this operation, the brake fluid within the cylinder Wh is returned to the reservoir RS1, whereby the brake hydraulic pressure within the cylinder Wh is decreased. Therefore, the brake unit 19 applies no braking force to the output shaft 73. In other words, the brake unit 19 applies no braking force to the left and right rear wheels RW1, RW2.

As a result, in the brake unit 19, the friction engagement between the plates of the multiplate wet brake is broken, and generation of friction heat is restrained. Therefore, the temperature Ty of the lubrication oil is maintained at the predetermined temperature Tyu or less, and the amount of heat exchanged by the heat exchanger 74 decreases. As a result, the temperature Tw of the cooling water (hot water) can be maintained at the predetermined temperature Twu or less. Even in such a case, since the temperature difference between the cooling water (cool water) supplied directly from the radiator 75 and the cooling water (hot water) supplied from the engine 71 is maintained, the electric power collection section 30 can continuously convert thermal energy to electric energy, and store regenerative electric power. Moreover, the cooling water temperature Tw and the lubrication oil temperature Ty can be maintained at the predetermined temperature Twu or less and the predetermined temperature Tyu or less, respectively, the engine 71 and the transmission 72 can be operated properly.

Meanwhile, the FR brake hydraulic pressure adjustment section 22, the FL brake hydraulic pressure adjustment section 23, the RL brake hydraulic pressure adjustment section 24, and the RR brake adjustment section 25 switch the pressure-increasing valve PUfr and the pressure-reducing valve PDfr, the pressure-increasing valve PUfl and the pressure-reducing valve PDfl, the pressure-increasing valve PUrl and the pressure-reducing valve PDrl, and the pressure-increasing valve PUrr and the pressure-reducing valve PDrr to their unexcited states (their first positions). With this operation, brake fluid is supplied to the wheel cylinder Wfr, the wheel cylinder Wfl, the wheel cylinder Wrl, and the wheel cylinder Wrr, whereby the brake hydraulic pressures within the wheel cylinder Wfr, the wheel cylinder Wfl, the wheel cylinder Wrl, and the wheel cylinder Wrr are increased. Therefore, the brake units 11, 12, 13, 14 can apply braking forces to the left and right front wheels FW1, FW2 and the left and right rear wheels RW1, RW2 in accordance with the second braking force map.

As can be understood from the above description, according to this third embodiment, the brake unit 19 can be provided on the output shaft 73 of the transmission 72. The brake unit 19 can apply braking forces to the left and right rear wheels RW1, RW2, which are drive wheels, by means of applying braking force against rotation of the output shaft 73.

Furthermore, as a result of application of braking force to the output shaft 73 by the brake unit 19, the temperature Ty of the lubrication oil circulating through the transmission 72 can be increased. Thus, the heat exchanger 74 can collect thermal energy; i.e., perform heat exchange between the hot lubrication oil having an increased oil temperature Ty and the cooling water (cool water) cooled by the radiator 75, and the cooling water (cool water) whose temperature Tw has been increased through the heat exchange can be introduced into the engine 71. Furthermore, since the heating side of the thermoelectric conversion unit 34 of the electric power collection section 30 (specifically, the plurality of thermoelectric conversion sections 31) is heated by the cooling water (hot water) having flowed through the engine 71 and the cooling side thereof is cooled by the cooling water (cool water) cooled by the radiator 75, the plurality of thermoelectric conversion section 31 can generate regenerative electric power.

Specifically, through execution of the braking-force-distribution changing program, the electronic control unit 51 can operate the brake unit 19 preferentially in accordance with the first braking force map to thereby apply braking forces to the left and right rear wheels RW1, RW2, when the detected water temperature Tw and the detected oil temperature Ty are equal to or less lower than the previously set, predetermined temperature Twu and predetermined temperature Tyu, respectively.

With this operation, the temperature Ty of the lubrication oil can be increased quickly by friction heat generated as a result of application of braking force by the brake unit 19. Accordingly, it is possible to utilize (collect) the thermal energy of the hot lubrication oil by means of the heat exchanger 74 to thereby increase the temperature Tw of the cooling water (cool water), and to introduce the cooling water (cool water) having an increased temperature Tw into the engine 71. Thus, it is possible to prevent malfunction of the engine 71 which would otherwise occur due to over cooling. Moreover, the thermoelectric conversion unit 34 can collect the cooling water (hot water; i.e., thermal energy) from the engine 71, efficiently convert it to regenerative electric power (electric energy), and output the regenerative electric power.

Meanwhile, when the detected water temperature Tw or the detected oil temperature Ty is higher than the predetermined temperature Twu or the predetermined temperature Tyu, the electronic control unit 51 can change the braking force distribution in accordance with the second braking force map such that the proportion (ratio) of the braking forces of the brake units 11, 12, 13, 14 to the total braking force required to realize the demanded deceleration Gd becomes greater than the proportion (ratio) of the braking force of the brake unit 19 to the total braking force. By virtue of this configuration, the detected water temperature Tw or the detected oil temperature Ty can be prevented from increasing excessively, and the engine 71 and the transmission 72 can be operated properly. In addition, the thermoelectric conversion unit 34 can efficiently convert thermal energy to electric energy, to generate regenerative electric power.

Moreover, by means of operating the brake units 11 to 14; in other words, by means of changing the braking force distribution such that the proportion (ratio) of the braking forces of the brake units 11, 12, 13, 14 to the total braking force increases, braking forces can be applied to the left and right front wheels FW1, FW2 and the left and right rear wheels RW1, RW2. With this operation, the vehicle can be decelerated properly without making vehicle behavior unstable.

Accordingly, the braking apparatus 10 according to the third embodiment can also decelerate the vehicle stably by properly applying braking forces to the left and right front wheels FW1, FW2 and the left and right rear wheels RW1, RW2. In addition, thermal energy generated as a result of braking can be efficiently collected and utilized, and can be efficiently converted to electric energy so as to generate regenerative electric power. That is, the braking apparatus 10 according to the third embodiment can also satisfy a conflicting requirement of improving the conversion efficiency of the thermoelectric conversion unit 34 (the thermoelectric conversion section 31) without decreasing the braking forces produced by the brake units 11, 12, 13, 14, 19.

Moreover, since the brake unit 19 can apply braking force against rotation of the output shaft 73; in other words, apply braking forces to the left and right rear wheels RW1, RW2, which are drive wheels, the operation frequencies of the brake units 11, 12, 13, 14 can be reduced. Thus, the brake units 11 to 14 can be cooled satisfactorily, whereby the thermal capacities of the brake units 11 to 14 can be reduced, and, in particular, the size of the brake units 13, 14 disposed on the drive wheel side can be reduced.

e. Modifications of the Third Embodiment e-1. First Modification of the Third Embodiment

In the above-described third embodiment, in step S15 of the braking-force-distribution changing program shown in FIG. 15, the electronic control unit 51 stops the operation of the brake unit 19, operates the brake units 11, 12, 13, 14, and changes the proportion of the braking forces applied to the left and right front wheels FW1, FW2 and the proportion of the braking forces applied to the left and right rear wheels RW1, RW2 in accordance with the second braking force map shown in FIG. 7. However, the cooling water (hot water) is quickly cooled by the radiator 75. As a result, the hot lubrication oil having circulated through the transmission 72 is quickly cooled through heat exchange performed by the heat exchanger 74 between the lubrication oil and the cooling water (cool water). Therefore, the present invention can be embodied such that the operation of the brake unit 19 is not stopped. In the below description, this first modification of the third embodiment will be described.

In this first modification, when the electronic control unit 51 determines braking forces to be applied to the left and right rear wheels RW1, RW2 in accordance with the second braking force map, the electronic control unit 51 determines, in a coordinated manner, the braking force of the brake unit 19 and the braking forces of the brake units 13, 14 in accordance with, for example, the cooling water temperature Tw detected by the water temperature sensor 46 and the oil temperature Ty detected by the oil temperature sensor 47.

More specifically, for example, in a situation where the detected water temperature Tw is higher than the predetermined temperature Twu or the detected oil temperature Ty is higher than the predetermined temperature Tyu, in order to apply braking forces to the left and right rear wheels RW1, RW2 in accordance with the second braking force map, the electronic control unit 51 decreases (to zero) the braking force of the brake unit 19 to thereby restrain the generation of friction heat, and increases the braking forces of the brake units 13, 14 for coordination. As described above, by means of controlling the braking force of the brake unit 19 and the braking forces of the drum brake units 13, 14 in a coordinated manner, a change in the temperature Tw of the cooling water (hot water) can be restrained to a very small level. As a result, the temperature difference between the cooling water (cool water) supplied directly from the radiator 75 and the cooling water (hot water) supplied from the engine 71 is maintained satisfactorily. Therefore, the electric power collection section 30 can continuously convert thermal energy to electric energy, and store regenerative electric power efficiently. Other effects are similar to those attained in the above-described third embodiment.

e-2. Second Modification of the Third Embodiment

In the above-described third embodiment, in step S15 of the braking-force-distribution changing program, the electronic control unit 51 applies braking forces to the left and right front wheels FW1, FW2 and the left and right rear wheels RW1, RW2 in accordance with the second braking force map shown in FIG. 7. However, the present invention may be embodied such that, in step S15, the electronic control unit 51 applies braking forces to the left and right front wheels FW1, FW2 in accordance with the third braking force map shown in FIG. 9, rather than the second braking force map shown in FIG. 7. In the below description, this second modification of the third embodiment will be described.

In this second modification as well, in a situation where the detected water temperature Tw is higher than the predetermined temperature Twu or the detected oil temperature Ty is higher than the predetermined temperature Tyu; that is, when the electronic control unit 51 makes a "No" determination in step S30 of the braking-force-distribution changing program shown in FIG. 15, the electronic control unit 51 proceeds to step S15. In step S15 in this second modification, in accordance with the third braking force map shown in FIG. 9, the electronic control unit 51 stops operations of the brake unit 19 and the brake units 13, 14 for the left and right rear wheels RW1, RW2, and operates the brake units 11, 12 for the left and right front wheels FW1, FW2. That is, in this case, the proportion of the braking force of the brake unit 19 is rendered zero.

Specifically, the electronic control unit 51 operates the brake hydraulic pressure control section 20 by supplying predetermined drive currents via the drive circuit 52. In the brake hydraulic pressure control section 20, by making use of the supplied predetermined drive currents, the TM brake hydraulic pressure control section 27 switches the pressure-increasing valve PUh and the pressure-reducing valve PDh to their excited states (their second positions). With this operation, the brake fluid within the cylinder Wh is returned to the reservoir RS1, whereby the brake hydraulic pressure within the cylinder Wh is decreased. Therefore, the brake unit 19 applies no braking force to the output shaft 73. In other words, the brake unit 19 applies no braking force to the left and right rear wheels RW1, RW2.

Notably, in this case as well, since the temperature difference between the cooling water (cool water) supplied directly from the radiator 75 and the cooling water (hot water) supplied from the engine 71 is maintained, the electric power collection section 30 can continuously convert thermal energy to electric energy, and store regenerative electric power efficiently. Moreover, since the generation of friction heat by the brake unit 19 is restrained, an increase in the temperature Ty of the lubrication oil is restrained, and the amount of heat exchanged by the heat exchanger 74 decreases. As a result, the temperature Tw of the cooling water (hot water) can be decreased to the predetermined temperature Twu or less. Therefore, the cooling water temperature Tw and the lubrication oil temperature Ty can be maintained at the predetermined temperature Twu or less and the predetermined temperature Tyu or less, respectively, whereby the engine 71 and the transmission 72 can be operated properly.

Furthermore, in the brake hydraulic pressure control section 20, by making use of the supplied predetermined drive currents, the RL brake hydraulic pressure adjustment section 24 and the RR brake hydraulic pressure adjustment section 25 switch the pressure-increasing valve PUrl and the pressure-reducing valve PDrl, and the pressure-increasing valve PUrr and the pressure-reducing valve PDrr to their excited states (their second positions). With this operation, the brake fluid within the wheel cylinder Wrl and the wheel cylinder Wrr is returned to the reservoir RS2, whereby the brake hydraulic pressures within the wheel cylinder Wrl and the wheel cylinder Wrr are reduced. Accordingly, the brake units 13, 14 apply no braking force to the left and right rear wheels RW1, RW2.

Meanwhile, the FR brake hydraulic pressure adjustment section 22 and the FL brake adjustment section 23 maintain the pressure-increasing valve PUfr and the pressure-reducing valve PDfr, and the pressure-increasing valve PUfl and the pressure-reducing valve PDfl in their unexcited states (their first positions). With this operation, the brake fluid at the upstream sides of the FR brake hydraulic pressure adjustment section 22 and the FL brake adjustment section 23 is supplied to the wheel cylinder Wfr and the wheel cylinder Wfl, whereby the brake hydraulic pressures within the wheel cylinder Wfr and the wheel cylinder Wfl are increased. Accordingly, the brake units 11, 12 apply braking forces to the left and right front wheels FW1, FW2.

Incidentally, in the third embodiment as well, in the case where the demanded deceleration Gd is realized by use of only the brake units 11, 12, the load imposed on the brake units 11, 12 increases, and the brake units 11, 12 may surfer a fading phenomenon. Moreover, when the magnitude of the demanded deceleration Gd is greater than the deceleration generated in the vehicle by means of the braking forces applied to the left and right front wheels FW1, FW2 by the brake units 11, 12, the brake units 13, 14 must be operated so as to apply braking forces to the left and right rear wheels RW1, RW2 as well.

Therefore, as in the case of the above-described second embodiment, in accordance with the third braking force map shown in FIG. 9, the electronic control unit 51 first operates the brake units 11, 12 until a predetermined braking force (corresponding to a predetermined deceleration) is attained to thereby apply braking forces only to the left and right front wheels FW1, FW2. After that, the electronic control unit 51 operates the brake units 13, 14 for the left and right rear wheels RW1, RW2 through EBD control. With this operation, the load of the brake units 11, 12 can be reduced to thereby prevent occurrence of a fading phenomenon, whereby the vehicle can be braked properly.

Notably, in this case, in the brake hydraulic pressure control section 20, the RL brake hydraulic pressure adjustment section 24 and the RR brake hydraulic pressure adjustment section 25 switch the pressure-increasing valve PUrl and the pressure-reducing valve PDrl, and the pressure-increasing valve PUrr and the pressure-reducing valve PDrr to their unexcited states (their first positions). As a result, the brake fluid at the upstream sides of the RL brake hydraulic pressure adjustment section 24 and the RR brake hydraulic pressure adjustment section 25 is supplied to the wheel cylinder Wrl and the wheel cylinder Wrr, whereby the brake hydraulic pressures within the wheel cylinder Wrl and the wheel cylinder Wrr are increased. Accordingly, the brake units 13, 14 apply braking forces to the left and right front wheels FW1, FW2. Notably, in this case as well, it is possible to operate the brake unit 19 and the brake units 13, 14 in a coordinated manner, to thereby apply braking forces to the left and right rear wheels RW1, RW2.

Accordingly, in this second modification as well, the effects similar to those attained in the above-described third embodiment are expected.

Figure 16:
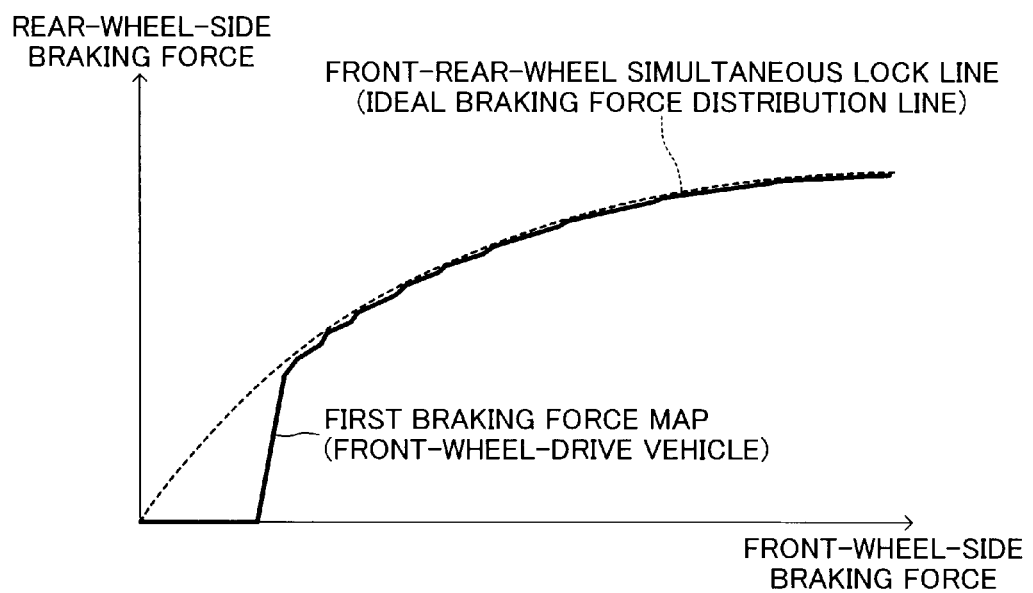
FIG. 16 is a graph relating to a modification of the third embodiment of the present invention and used for describing a first braking force map which represents the ratio between front-wheel-side braking force and rear-wheel-side braking force and which is applied to a front-wheel-drive vehicle.

In the above-described third embodiment and modifications thereof, the vehicular braking apparatus 10 is applied to a rear-wheel-drive vehicle in which the output from the transmission 72 is transmitted to the left and right rear wheels RW1, RW2. However, the vehicular braking apparatus 10 may be applied to a front-wheel-drive vehicle in which the output from the transmission 72 is transmitted to the left and right front wheels FW1, FW2. In this case, in step S14 of the braking-force-distribution changing program shown in FIG. 15, the electronic control unit 51 operates the brake unit 19 in accordance with the first braking force map modified as shown in FIG. 16, to thereby apply braking forces to the left and right front wheels FW1, FW2 preferentially. Therefore, in this case as well, the effects similar to those attained in the third embodiment are expected.

In the above-described third embodiment and modifications thereof, the vehicular braking apparatus 10 is applied to a rear-wheel-drive vehicle in which the output from the transmission 72 is transmitted to the left and right rear wheels RW1, RW2. However, the vehicular braking apparatus 10 may be applied to a torque-split-type-four-wheel-drive vehicle. In such a torque-split-type-four-wheel-drive vehicle, the output (that is, drive force and braking force) from the transmission 72 is distributed to the left and right front wheels FW1, FW2 and the left and right rear wheels RW1, RW2 via, for example, a transfer or the like.

Accordingly, in the case where the vehicular braking apparatus 10 is applied to such a torque-split-type-four-wheel-drive vehicle, the braking force of the brake unit 19 is properly distributed to the left and right front wheels FW1, FW2 and the left and right rear wheels RW1, RW2. Therefore, when the electronic control unit 51 executes the step S14 of the braking-force-distribution changing program shown in FIG. 15, the electronic control unit 51 can apply braking forces to the left and right rear wheels RW1, RW2 by operating the brake unit 19 in accordance with the second braking force map shown in FIG. 7, instead of the first braking force map shown in FIG. 6. That is, in the case where the vehicular braking apparatus 10 is applied to a torque-split-type-four-wheel-drive vehicle, the first braking force map shown in FIG. 6 can be omitted. Other effects are similar to those attained in the above-described third embodiment and modifications thereof.

In the above-described third embodiment and modifications thereof, the brake unit 19 is a multiplate wet brake. Friction heat generated by mechanical friction between the plates increases the temperature Ty of the lubrication oil circulating through the transmission 72. However, the mechanism of the brake unit 19 may be freely determined so long as the brake unit 19 can apply braking force to the output shaft 73, and can increase the temperature Ty of the lubrication oil circulating through the transmission 72. For example, there may be employed a brake mechanism in which viscous friction generated by stirring the lubrication oil filling the interior of the casing of the transmission 72 is applied, as resistance, against rotation of the output shaft 73. When the brake unit 19 stirs the lubrication oil in order to apply braking force against rotation of the output shaft 73, the generated viscous friction increases the lubrication oil temperature Ty. Therefore, in this case as well, the effects similar to those attained in the third embodiment and modifications thereof are expected.

In the above-described third embodiment and modifications thereof, the brake unit brake unit 13, 14 are provided on the drive wheel side (provided for the left and right rear wheels RW1, RW2). In this case, as described above, the brake unit 19 can apply braking forces against rotations of the drive wheels (the left and right rear wheels RW1, RW2). Therefore, the brake units 13, 14 can be omitted. In this case, cost can be reduced, and, for example, unsprung mass can be decreased.

In the above-described third embodiment and modifications thereof, by means of providing the brake unit 19 which applies breaking force against rotation of the output shaft 73, braking forces can be applied to the left and right rear wheels RW1, RW2. Therefore, it is possible to omit a parking brake apparatus which is conventionally disposed in the vicinity of the left and right rear wheels RW1, RW2 (or the left and right front wheels FW1, FW2), and to cause the brake unit 19 to function as a parking brake apparatus. This also reduces cost and decreases, for example, unsprung mass.

In the above-described third embodiment and modifications thereof, the heating side of each thermoelectric conversion section 31, which constitutes the thermoelectric conversion unit 34, is heated by the cooling water (hot water) supplied from the engine 71. Alternatively or additionally, the heating side of each thermoelectric conversion section 31, which constitutes the thermoelectric conversion unit 34, may be heated directly by the hot lubrication oil discharged from the transmission 72. In this case, each thermoelectric conversion section 31 can generate regenerative electric power in accordance with the temperature difference between the hot lubrication oil and the cooling water (cool water).

In this case, in place of or in addition to the braking-force-distribution changing program shown in FIG. 15, the electronic control unit 51 can execute, for example, the braking-force-distribution changing program shown in FIG. 5 and described in the first embodiment or the braking-force-distribution changing program shown in FIG. 8 and described in the second embodiment. Notably, in this case, preferably, instead of the detected temperature T of the internal space described in the first and second embodiments, the oil temperature Ty detected by the oil temperature sensor 47 is compared with the predetermined temperature Ts or the predetermined temperature Tu. In this case, the thermoelectric conversion section 31 can generate regenerative electric power more efficiently.

The present invention is not limited to the above-described embodiments and modifications thereof, and the present invention can be modified without departing from the scope of the invention.

For example, in the above-described embodiments and modifications thereof, the present invention is embodied such that thermal energy (specifically, friction heat) generated as a result of application of braking forces to the left and right rear wheels RW1, RW2 is collected, and the collected thermal energy is converted to electric energy. More specifically, the present invention is embodied such that the electric power collection section 30 is assembled or connected to the brake units 13, 14, 15, 16, 17, 18, 19 provided for the left and right rear wheels RW1, RW2. However, the present invention may be embodied as follows. The brake units 11, 12 provided for the left and right front wheels FW1, FW2 and the brake units 13 to 19 provided for the left and right rear wheels RW1, RW2, which are described in the above-described embodiments and modifications thereof, are switched; thermal energy (friction heat) generated as a result of application of braking forces to the left and right front wheels FW1, FW2 is collected; and the collected thermal energy is converted to electric energy.

In this case, the first braking force map to which the electronic control unit 51 refers in step S14 of the above-described braking-force-distribution changing programs is changed to apply braking forces to the left and right front wheels FW1, FW2 preferentially as in the case of the third braking force map shown in FIG. 9. When the electronic control unit 51 changes the proportion of the braking forces applied to the left and right front wheels FW1, FW2 and the proportion of the braking forces applied to the left and right rear wheels RW1, RW2 in accordance with the changed first braking force map, effects similar to those attained in the above-described embodiments and modifications thereof can be attained.

In the above-described embodiments and modifications thereof, the electronic control unit 51 utilizes EBD when it changes the proportion of the braking forces applied to the left and right front wheels FW1, FW2 and the proportion of the braking forces applied to the left and right rear wheels RW1, RW2. Thus, the proportions are controlled such that the line representing the ratio between the braking forces to the left and right front wheels FW1, FW2 and the braking forces applied to the left and right rear wheels RW1, RW2 gradually approaches the front-rear-wheel simultaneous lock line (ideal braking force distribution line). In this case, for a vehicle in which the vehicle weight is quite unequally distributed between the left and right front wheels FW1, FW2 and the left and right rear wheels RW1, RW2 (for example, a truck whose load-carrying platform is empty), known proportional valves may be provided in the brake hydraulic pressure control section 20 so as to determine the ratio between braking force applied to the left and right front wheels FW1, FW2 and braking force applied to the left and right rear wheels RW1, RW2.

Figure 17:
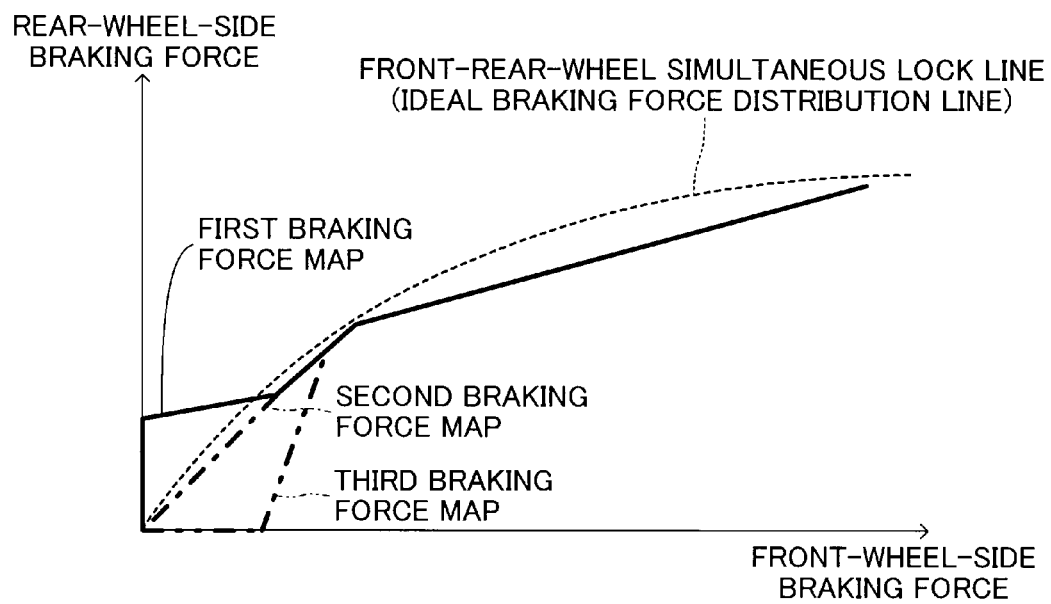
FIG. 17 is a graph used for describing an alteration of the first through third embodiments of the present invention and the modifications thereof.

In this case, as shown in FIG. 17, by operating the proportional valves, the proportion of the braking forces applied to the left and right front wheels FW1, FW2 and the proportion of the braking forces applied to the left and right rear wheels RW1, RW2 are determined on the basis of a proportional relation. In this case, although the line representing the ratio between the braking forces to the left and right front wheels FW1, FW2 and the braking forces applied to the left and right rear wheels RW1, RW2 does not gradually approach the front-rear-wheel simultaneous lock line (ideal braking force distribution line) well, it is possible to apply proper braking forces to the left and right front wheels FW1, FW2 and the left and right rear wheels RW1, RW2, while stabilizing vehicle behavior, in particular in a vehicle in which vehicle weight distribution is very uneven.

In the above-described embodiments and modifications thereof, no particular limitation is imposed on the number of the braking force maps to which the electronic control unit 51 refers. For example, the present invention may be embodied such that a larger number of braking force maps are prepared such that the braking force maps correspond to different ranges of the detected temperature T of the heating side of the thermoelectric conversion section 31, and the electronic control unit 51 change the ratio between the braking forces applied to the left and right front wheels FW1, FW2 and the braking forces applied to the left and right rear wheels RW1, RW2 in accordance with one of the braking force map selected in accordance with the detected temperature T of the heating side. In this case, the heating side temperature can be controlled more finely in accordance with the temperature dependency of the thermoelectric conversion section 31, whereby the conversion efficiency of the thermoelectric conversion section 31 can be improved further. In addition, the vehicle can be braked by more finely changing the distribution of braking force between the left and right front wheels FW1, FW2 and the left and right rear wheels RW1, RW2.

In the above-described embodiments and modifications thereof, the temperature which changes as a result of operation of the brake unit 13 to 19 which includes the thermoelectric conversion section 31 provided thereon (or connected thereto) is detected. However, the present invention may be embodied such that the temperature of the brake unit 11, 12 (in the third embodiment, the brake unit 11, 12, 13, 14) which does not include the thermoelectric conversion section 31 is detected. In this case, the electronic control unit 51 changes a braking force map to be referred to, in accordance with the temperature of the brake unit which does not include the thermoelectric conversion section 31.

Thus, for example, in a situation where a fading phenomenon may occur as a result of preferentially operating brake units which are excellent in cooling in accordance with the third braking force map shown in FIG. 9, the electronic control unit 51 can change the map to the first braking force map shown in FIG. 6 or the second braking force map shown in FIG. 7, although the conversion efficiency of the thermoelectric conversion section 31 deteriorates. Thus, by means of decelerating the vehicle through operation of the brake units including the thermoelectric conversion section 31, the vehicle can be decelerated reliably.

In the above-described embodiments and modifications thereof, the electronic control unit 51 change the braking force distribution (the ratio between the braking forces applied to the left and right front wheels FW1, FW2 and the braking forces applied to the left and right rear wheels RW1, RW2) by making use of the deceleration G detected by the longitudinal acceleration sensor 41. However, the present invention may be embodied such that the braking force distribution is changed in consideration of unstable vehicle behavior which is likely to occur if braking forces are applied only to the left and right rear wheels RW1, RW2 (or the left and right front wheels FW1, FW2) when the vehicle is turning.

Specifically, the vehicular braking apparatus 10 includes, for example, a yaw rate sensor for detecting yaw rate generated in the vehicle, a lateral acceleration sensor for detecting lateral acceleration generated in the vehicle, a steering angle sensor for detecting an operation amount (steering angle) of the steering wheel operated by the driver, or a like sensor. These sensors serve as physical quantity detection means for detecting a physical quantity regarding change in behavior of the vehicle. The electronic control unit 51 changes the ratio between the braking forces applied to the left and right front wheels FW1, FW2 and the braking forces applied to the left and right rear wheels RW1, RW2 by using the physical quantity regarding change in behavior of the vehicle, which is detected by the yaw rate sensor, the lateral acceleration sensor, the steering angle sensor, etc.

With this operation, for example, in the case where braking forces are applied only to the left and right rear wheels RW1, RW2 (or the left and right front wheels FW1, FW2) in accordance with the first braking force map (or the third braking force map), if the yaw rate detected by the yaw rate sensor is large, the electronic control unit 51 changes the braking force distribution such that the braking forces applied to the left and right front wheels FW1, FW2 (or the left and right rear wheels RW1, RW2) increase, to thereby prevent the vehicle behavior form becoming unstable. Accordingly, through use of a physical quantity regarding change in behavior of the vehicle, the braking force distribution can be changed in consideration of unstable behavior of the vehicle.

The invention claimed is:

1. A braking apparatus for a vehicle which applies braking forces against rotations of wheels and which collects thermal energy generated as a result of application of the braking forces, comprising:

a first braking force application unit that applies braking force against rotation of a wheel by means of friction, the first braking force application unit including a heat collection unit that collects thermal energy generated by the friction;

a second braking force application unit that applies braking force against rotation of a wheel by means of friction;

a temperature detection unit that detects a temperature which changes as a result of application of frictional braking force by the first braking force application unit;

a braking request detection unit that detects a driver's request for braking the vehicle; and a braking-force-distribution changing unit that changes and sets a proportion of the braking force applied by the first braking force application unit and a proportion of the braking force applied by the second braking force application unit in accordance with the driver's request for braking the vehicle detected by the braking request detection unit, wherein, when the temperature detected by the temperature detection unit satisfies a predetermined condition, the braking-force-distribution changing unit sets the proportion of the braking force applied by the first braking force application unit to become larger than the proportion of the braking force applied by the second braking force application unit, wherein, when the temperature detected by the temperature detection unit does not satisfy the predetermined condition, the braking-force-distribution changing unit sets the proportion of the braking force applied by the second braking force application unit to become larger than the proportion of the braking force applied by the first braking force application unit, wherein the predetermined condition is such that the temperature detected by the temperature detection unit is equal to or lower than a predetermined temperature which is determined on the basis of a temperature characteristic of the heat collection unit, and the predetermined temperature is equal to a lower limit temperature of a temperature region for collection of the thermal energy, wherein the braking-force-distribution changing unit sets the proportion of the braking force applied by the second braking force application unit to zero, when the temperature detected by the temperature detection unit satisfies the predetermined condition, and wherein the braking-force-distribution changing unit increases the proportion of the braking force applied by the second braking force application unit, when a demanded braking force corresponding to the braking request detected by the braking request detection unit is greater than the braking force applied by the first braking force application unit.

2. The braking apparatus for a vehicle according to claim 1, wherein the predetermined temperature is a temperature at which the frictional braking force of the first braking force application unit starts to decrease.

3. The braking apparatus for a vehicle according to claim 1, wherein the demanded braking force corresponding to the braking request detected by the braking request detection unit represents a deceleration of the vehicle requested by the driver; and the braking-force-distribution changing unit increases the proportion of the braking force applied by the second braking force application unit, when the deceleration of the vehicle requested by the driver is greater than a deceleration which is generated in the vehicle upon application of braking force by the first braking force application unit.

4. The braking apparatus for a vehicle according to claim 1, further comprising physical quantity detection unit that detects a physical quantity associated with a change in behavior of the vehicle, wherein the braking-force-distribution changing unit increases the proportion of the braking force applied by the second braking force application unit or the proportion of the braking force applied by the first braking force application unit by making use of the physical quantity detected by the physical quantity detection unit, when a change in behavior of the vehicle arises.

5. The braking apparatus for a vehicle according to claim 1, wherein
the first braking force application unit applies braking forces to left and right rear wheels of the vehicle; and
the second braking force application unit applies braking forces to left and right front wheels of the vehicle.

6. The braking apparatus for a vehicle according to claim 1, wherein
the first braking force application unit is a drum brake; and
the second braking force application unit is a disc brake.

7. The braking apparatus for a vehicle according to claim 6, wherein the first braking force application unit is a drum-in disc brake in which a drum brake is incorporated into a disk brake.

8. The braking apparatus for a vehicle according to claim 1, wherein
the first braking force application unit is composed of a single brake disc and one of at least two calipers provided for the brake disc, the heat collection unit being brought into contact with and separated from the brake disc by the one caliper so as to apply braking force against rotation of one of the wheels by friction; and
the second braking force application unit is composed of the single brake disc and the other of the two calipers provided for the brake disc, wherein a brake pad is brought into contact with and separated from the brake disc by the other caliper so as to apply braking force against rotation another one of the wheels by unit of friction.

9. The braking apparatus for a vehicle according to claim 1, wherein the first braking force application unit is provided within a transmission which is connected to an engine of the vehicle and to drive wheels of the vehicle, applies braking force to an output shaft of the transmission by means of friction to thereby apply braking force against rotations of the drive wheels, and includes the heat collection unit for collecting thermal energy generated by the friction.

10. The braking apparatus for a vehicle according to claim 9, wherein the heat collection unit includes heat exchange unit for performing heat exchange between cooling water supplied to the engine and lubrication oil which flows through the transmission and whose temperature increases upon application of frictional braking force to the output shaft of the transmission; and thermal energy carried by the cooling water having undergone heat exchange performed by the heat exchange unit and having flowed through the engine is collected.

11. The braking apparatus for a vehicle according to claim 10, wherein
the temperature detection unit detects the temperature of the cooling water having flowed through the engine and the temperature of the lubrication oil having flowed through the transmission; and
the predetermined condition is such that the water temperature and the oil temperature detected by the temperature detection unit are equal to or lower than respective predetermined temperatures set for the water temperature and the oil temperature.

12. The braking apparatus for a vehicle according to claim 11, wherein the predetermined temperatures are determined on the basis of temperatures at which the engine of the vehicle and the transmission operate properly.

13. The braking apparatus for a vehicle according to claim 12, wherein the heat collection unit converts to electric energy the thermal energy generated as a result of application of the frictional braking force by the first braking force application unit.

14. The braking apparatus for a vehicle according to claim 13, wherein the heat collection unit is a thermoelectric conversion element whose one side is heated by friction heat generated by the friction in the first braking force application unit, whose other side is cooled, and which converts the thermal energy to the electric energy in accordance with a temperature difference between the one side and the other side.

* * * * *